(12) United States Patent  
Gejoh

(10) Patent No.: US 12,250,590 B2  
(45) Date of Patent: Mar. 11, 2025

(54) CONTROL DEVICE, AND CONTROL METHOD

(71) Applicant: Panasonic Corporation, Osaka (JP)

(72) Inventor: Noriyuki Gejoh, Tokyo (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 637 days.

(21) Appl. No.: 17/629,042

(22) PCT Filed: Jul. 22, 2020

(86) PCT No.: PCT/JP2020/028434  
§ 371 (c)(1),  
(2) Date: Jan. 21, 2022

(87) PCT Pub. No.: WO2021/015236  
PCT Pub. Date: Jan. 28, 2021

(65) Prior Publication Data  
US 2022/0322129 A1 Oct. 6, 2022

(30) Foreign Application Priority Data  
Jul. 25, 2019 (JP) .................................. 2019-136836  
Dec. 5, 2019 (JP) .................................. 2019-220163

(51) Int. Cl.  
*H04W 28/08* (2023.01)  
*H04W 16/14* (2009.01)  
(Continued)

(52) U.S. Cl.  
CPC ....... *H04W 28/0967* (2020.05); *H04W 16/14* (2013.01); *H04W 28/0236* (2013.01); *H04W 72/12* (2013.01); *H04W 72/541* (2023.01)

(58) Field of Classification Search  
None  
See application file for complete search history.

(56) References Cited

U.S. PATENT DOCUMENTS

2010/0008316 A1\* 1/2010 Liu ...................... H04W 72/541  
370/252  
2011/0136499 A1\* 6/2011 Miyata ................ H04W 72/541  
455/452.2  
(Continued)

FOREIGN PATENT DOCUMENTS

JP 2013-081089 A 5/2013  
WO WO-2018162787 A1 \* 9/2018

OTHER PUBLICATIONS

International Search Report issued in Patent Application No. PCT/JP2020/028434 dated Oct. 27, 2020.

*Primary Examiner* — Liem H. Nguyen  
(74) *Attorney, Agent, or Firm* — MCDONALD HOPKINS LLC

(57) ABSTRACT

This control device for performing channel allocation for terminals which support a first radio system and which belong to a first network is provided with: a receiving unit which acquires a classification result obtained by classifying interference detected in each of channels to first interference from a radio device which supports the first radio system and which belongs to the first network, and second interference different from the first interference; and a control unit which, on the basis of the sum of an unmanaged traffic amount of each of the channels, determined on the basis of the amount of interference of the second interference, and a managed traffic amount distributed to each terminal, determines the managed traffic amount for each channel, and which determines the number of terminals to be allocated to each of the channels on the basis of the managed traffic amount.

8 Claims, 12 Drawing Sheets

(51) Int. Cl.
*H04W 28/02* (2009.01)
*H04W 72/12* (2023.01)
*H04W 72/541* (2023.01)

(56) References Cited

U.S. PATENT DOCUMENTS

2017/0251481 A1* 8/2017 Nakayama .......... H04L 43/0894
2017/0359827 A1* 12/2017 Kim ...................... H04L 1/1822
2018/0063844 A1* 3/2018 Khoshnevisan ...... H04W 72/56
2020/0084777 A1* 3/2020 Ergen ...................... H04L 41/16

* cited by examiner

| | SYSTEM 1 (Required time interval: 5 min) | | | | SYSTEM 2 (Required time interval: 10 min) | | | |
|---|---|---|---|---|---|---|---|---|
| | TERMINAL 1 | TERMINAL 2 | TERMINAL 3 | TERMINAL 4 | TERMINAL 5 | TERMINAL 6 | TERMINAL 7 | TERMINAL 8 |
| Elapsed time from last successful communication | 2 min | 4 min | 12 min | 7 min | 9 min | 3 min | 12 min | 5 min |
| Assignment priority | 0.4 | 0.8 | 2.4 | 1.4 | 0.9 | 0.3 | 1.2 | 0.5 |
| Priority order | 7 | 5 | 1 | 2 | 4 | 8 | 3 | 6 |

CONTROL DEVICE, AND CONTROL METHOD

TECHNICAL FIELD

The present disclosure relates to a control apparatus and a control method.

BACKGROUND ART

Unlicensed bands are sometimes used for communication between radio communication apparatuses (e.g., between a base station and a terminal). Unlicensed bands are used by various radio systems, and interference may thus occur due to multiple factors.

For example, Patent Literature 1 discloses a radio communication system for determining channel assignment so that the amount of interference is minimized in a case of assigning channels to be used for communication to a plurality of base stations.

CITATION LIST

Patent Literature

PTL 1
Japanese Patent Application Laid-Open No. 2013-81089

SUMMARY OF INVENTION

There is scope for further study, however, on appropriate channel assignment taking interference into account.

One non-limiting and exemplary embodiment facilitates providing a control apparatus and a control method each capable of performing appropriate channel assignment taking interference into account.

A control apparatus according to an embodiment of the present disclosure is a control apparatus that performs channel assignment for a terminal supporting a first radio system and belonging to a first network, and the control apparatus includes: a receiver, which in operation, acquires a classification result of classifying interference detected in each of a plurality of channels as first interference and second interference other than the first interference, the first interference being interference from a radio apparatus that supports the first radio system and belongs to the first network; and a controller, which in operation, determines an in-control traffic amount to be distributed to the terminal in each of the plurality of channels based on a sum of an out-of-control traffic amount in each of the plurality of channels and the in-control traffic amount, the out-of-control traffic amount being determined according to an interference amount of the second interference, and determines, based on the in-control traffic amount, a number of a plurality of the terminals to be assigned to each of the plurality of channels.

A control method according to an embodiment of the present disclosure is a control method for performing channel assignment for a terminal that supports a first radio system and belongs to a first network, and the control method includes: acquiring a classification result of classifying interference detected in each of a plurality of channels as first interference and second interference other than the first interference, the first interference being interference from a radio apparatus that supports the first radio system and belongs to the first network; determining an in-control traffic amount to be distributed to the terminal in each of the plurality of channels based on a sum of an out-of-control traffic amount in each of the plurality of channels and the in-control traffic amount, the out-of-control traffic amount being determined according to an interference amount of the second interference; and determining, based on the in-control traffic amount, a number of a plurality of the terminals to be assigned to each of the plurality of channels.

It should be noted that general or specific embodiments may be implemented as a system, an apparatus, a method, an integrated circuit, a computer program, a storage medium, or any selective combination thereof.

According to an exemplary embodiment of the present disclosure, it is possible to perform channel assignment resulting in enhanced frequency utilization efficiency.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, suitable embodiments of the present disclosure will be described in detail with reference to the accompanying drawings. Components having substantially the same functions are denoted by the same reference signs in the present specification and drawings, and the repetitive descriptions thereof are omitted.

Embodiment

In unlicensed bands (e.g., frequency bands such as a 920 MHz band, 2.4 GHz band, and 5 GHz band), communication is performed by Internet of Things (IoT) terminals and/or Machine to Machine (M2M) terminals in addition to wireless Local Area Network (LAN) communication.

For IoT or M2M, for example, studies have been carried out on using a radio communication technique called Low Power Wide Area (LPWA), which enables wide area communication with low power consumption.

The LPWA has a plurality of schemes (standards). The communication schemes of the LPWA include, for example, the first communication scheme in which a spread spectrum technique is used for communication and the second communication scheme in which the spread spectrum technique is not used for communication. The first communication scheme includes a communication scheme called "LoRa", for example. The second communication scheme includes a communication scheme called "Wireless Smart Utility Network (Wi-SUN)", for example.

A terminal supporting communication of the LPWA system (hereinafter, sometimes referred to as an "LPWA terminal") is not limited to a terminal owned by a user, and is mounted on various devices. For example, the LPWA terminal is mounted on home appliances such as a television, air conditioner, washing machine, and refrigerator, as well as on mobile transportation devices such as a vehicle.

Besides the LPWA, various systems including Wi-fi (registered trademark) and Radio Frequency IDentifier (RFID), for example, use the unlicensed bands, resulting in a rapid increase in traffic and increased interference.

Thus, when channels for LPWA terminal communication are assigned in the LPWA system, for example, it is preferable to consider interference within the same system and interference from other systems.

Figure 1:
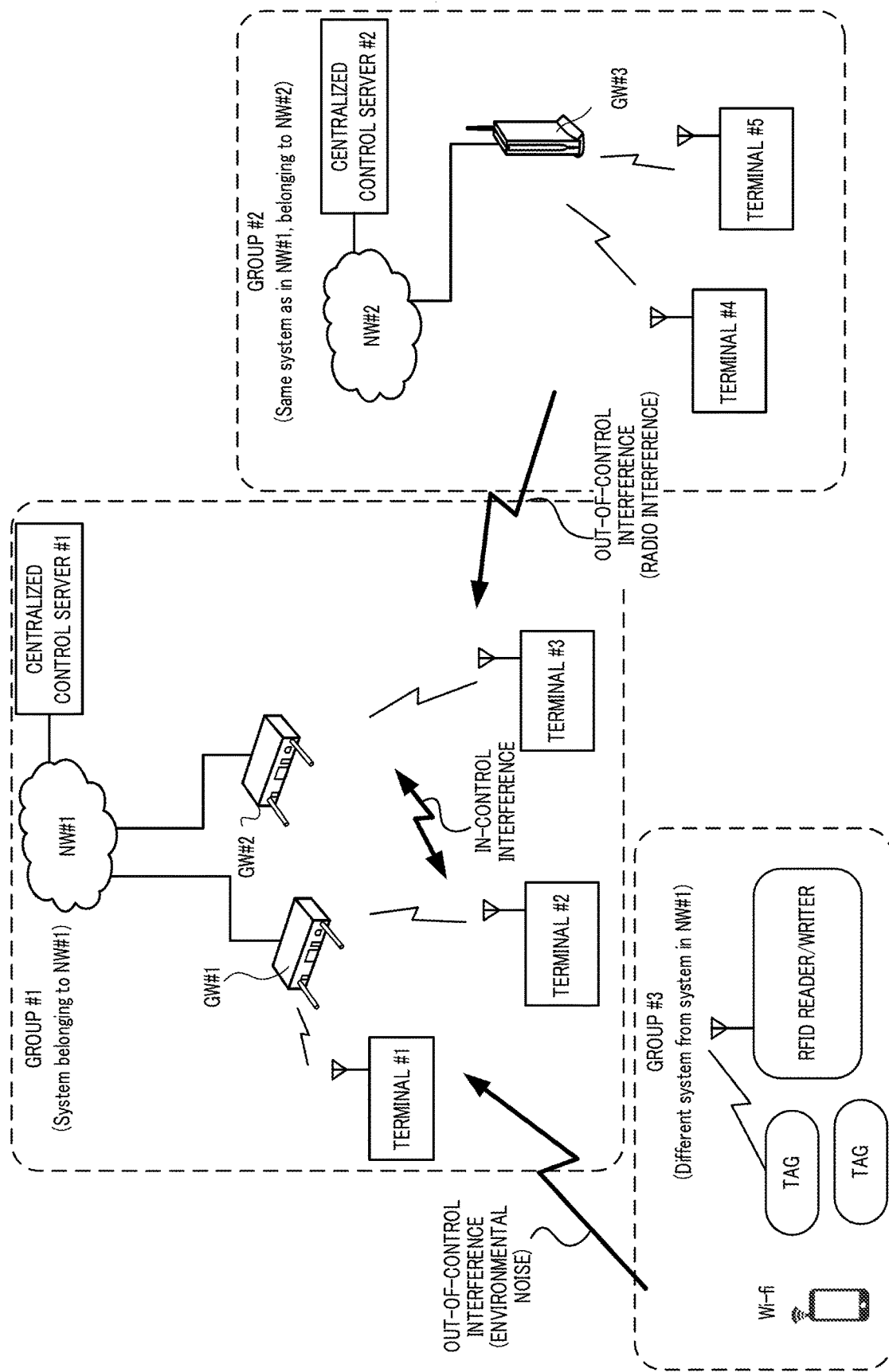
FIG. 1 illustrates an overview of radio systems including LPWA.

FIG. 1 illustrates an overview of radio systems including the LPWA.

Group #1, group #2, and group #3 are illustrated in FIG. 1. Each of the groups includes a plurality of apparatuses.

Groups #1 and #2 are both the LPWA systems; however, network #1 (NW #1) to which apparatuses in group #1 belong is different from network #2 (NW #2) to which apparatuses in group #2 belong. For example, NW #1 and NW #2 use the same LPWA system, but are respectively operated by different operators. The LPWA system of group #2 is an LPWA system of a network that is not controlled by group #1 (out-of-control network).

Group #1 includes apparatuses that belong to NW #1 and are connected to NW #1 by wire or radio. For example, group #1 includes gateway #1 (GW #1), GW #2, and terminals #1 to #3 in the LPWA system. In addition, group #1 includes centralized control server #1 for centrally controlling the GWs and the like via NW #1.

Group #2 includes apparatuses that belong to NW #2 and are connected to NW #2 by wire or radio. For example, group #2 includes GW #3 and terminals #4 and #5 in the LPWA system. In addition, group #2 includes centralized control server #2 for centrally controlling the GWs and the like via NW #2.

Note that the numbers of apparatuses in group #1 and group #2 in FIG. 1 are examples, and the present disclosure is not limited to these. For example, three or more GWs may be included in a single group. Also, one terminal or four or more terminals may be included in a single group.

Further, another apparatus may be connected to the NW of each group. For example, group #1 may include a relay station that relays radio communication between GW #1 and/or GW #2 and terminals #1 to #3. Note that group #2 may also include a similar relay station.

Group #3 is a radio system different from the radio system (LPWA system) of group #1. The radio system of group #3 is a radio system of an out-of-control network, which is not controlled by group #1. The radio system of group #3 is, for example, RFID, Wi-fi, etc. Group #3 includes, for example, an RFID reader/writer, an RFID tag, and a terminal that uses Wi-fi. Note that the radio system of group #3 may include a Long Term Evolution (LTE) system, a radar system, and the like. In addition, group #3 may include noise sources other than the radio systems, such as home appliances, lighting equipment, and heavy equipment.

Note that the network configuration and/or the apparatus configuration illustrated in FIG. 1 are examples, and the present disclosure is not limited to these.

Note that the GW described above may have a function of an interference monitoring apparatus for measuring interference. A "base station" in the following description corresponds to a GW with the function of an interference monitoring apparatus.

Further, each of the networks illustrated in FIG. 1 may also include an apparatus other than the apparatuses illustrated in FIG. 1. In this case, the apparatus may have some or all of the functions of the apparatuses illustrated in FIG. 1. In a case where a relay station is provided in group #1 or group #2, for example, the relay station may have the function of an interference monitoring apparatus. The relay station may also have the GW function and the interference monitoring function. Alternatively, the relay station may have the function of an interference monitoring apparatus and may not have the GW function.

Radio apparatuses in groups #1 to #3 use the same system band (e.g., unlicensed band). Thus, each of the radio apparatuses included in groups #1 to #3 is interfered by another radio apparatus. The following description is based on the interference received by a radio apparatus included in group #1, by way of example.

For example, a signal transmitted from the first radio apparatus (e.g., terminal #2) included in group #1 to the second radio apparatus (e.g., GW #1) included in group #1 may also be received (detected) by the third radio apparatus (e.g., GW #2) included in group #1. In this case, the signal may cause interference in the third radio apparatus. In the following, an interference signal received by a radio apparatus belonging to NW #1 from another radio apparatus belonging to NW #1 may be referred to as an "in-control signal". For example, the in-control signal corresponds to interference received by a radio apparatus that supports the LPWA system communication and belongs to NW #1 from another radio apparatus that supports the LPWA system communication and belongs to NW #1.

In addition, a signal transmitted by a radio apparatus included in group #2 and/or group #3 (e.g., terminal #5 and/or RFID reader/writer), for example, causes interference in a radio apparatus included in group #1 (e.g., terminal #1). In the following, interference received by a radio apparatus belonging to NW #1 from a radio apparatus not belonging to NW #1 may be referred to as "out-of-control interference". For example, the out-of-control interference corresponds to interference received by a radio apparatus that supports the LPWA system communication and belongs to NW #1 from a radio apparatus that does not belong to NW #1. Alternatively, the out-of-control interference corresponds to an interference component obtained by removing the in-control signal from a detected signal (interference).

The out-of-control interference may be further classified based on factors of the interference.

For example, a signal transmitted by a radio apparatus (e.g., terminal #4) included in group #2 causes interference in a radio apparatus (e.g., GW #1) included in group #1. In the following, interference received by a radio apparatus belonging to NW #1 from a radio apparatus belonging to NW #2 may be referred to as "radio interference" among the "out-of-control interference". For example, the "radio interference" corresponds to interference received by a radio apparatus that supports the LPWA system communication and belongs to NW #1 from a radio apparatus that supports the LPWA system communication and belongs to NW #2, which is different from NW #1.

For example, a signal transmitted by a radio apparatus (e.g., RFID reader/writer) included in group #3 causes interference in a radio apparatus (e.g., GW #1) included in group #1. In the following, interference received by a radio apparatus that supports the LPWA system communication and belongs to NW #1 from a radio apparatus that supports a radio system other than the LPWA system may be referred to as "environmental noise" among the "out-of-control interference".

As illustrated in FIG. 1 with examples, the LPWA system uses a common system band with a radio system other than the LPWA system and/or the same LPWA system that belongs to a different network. It is thus desirable to take into account interference in a channel.

For example, a terminal may randomly select a channel from a plurality of candidate channels during a transmission attempt, and perform signal transmission in the channel when the channel is determined to be available by carrier sensing. In this approach, however, a channel with a relatively higher rate of the above-described out-of-control interference is possibly selected, thereby decreasing probability of successful signal transmission. Alternatively, this approach increases a reception error rate due to the influence of the interference.

As another approach, a base station may measure reception power of each channel and preferentially assign a channel with relatively low reception power to a terminal, for example. In this approach, however, the measured reception power indicates power of a signal with the out-of-control interference and the in-control signal mixed together, and this makes it difficult to appropriately perform channel assignment.

A non-limiting and exemplary embodiment of the present disclosure facilitates providing a control apparatus and control method each capable of performing appropriate channel assignment taking interference into account by performing the channel assignment to a terminal based on a result obtained by classifying the interference.

<Exemplary Configuration of Network>

Figure 2:
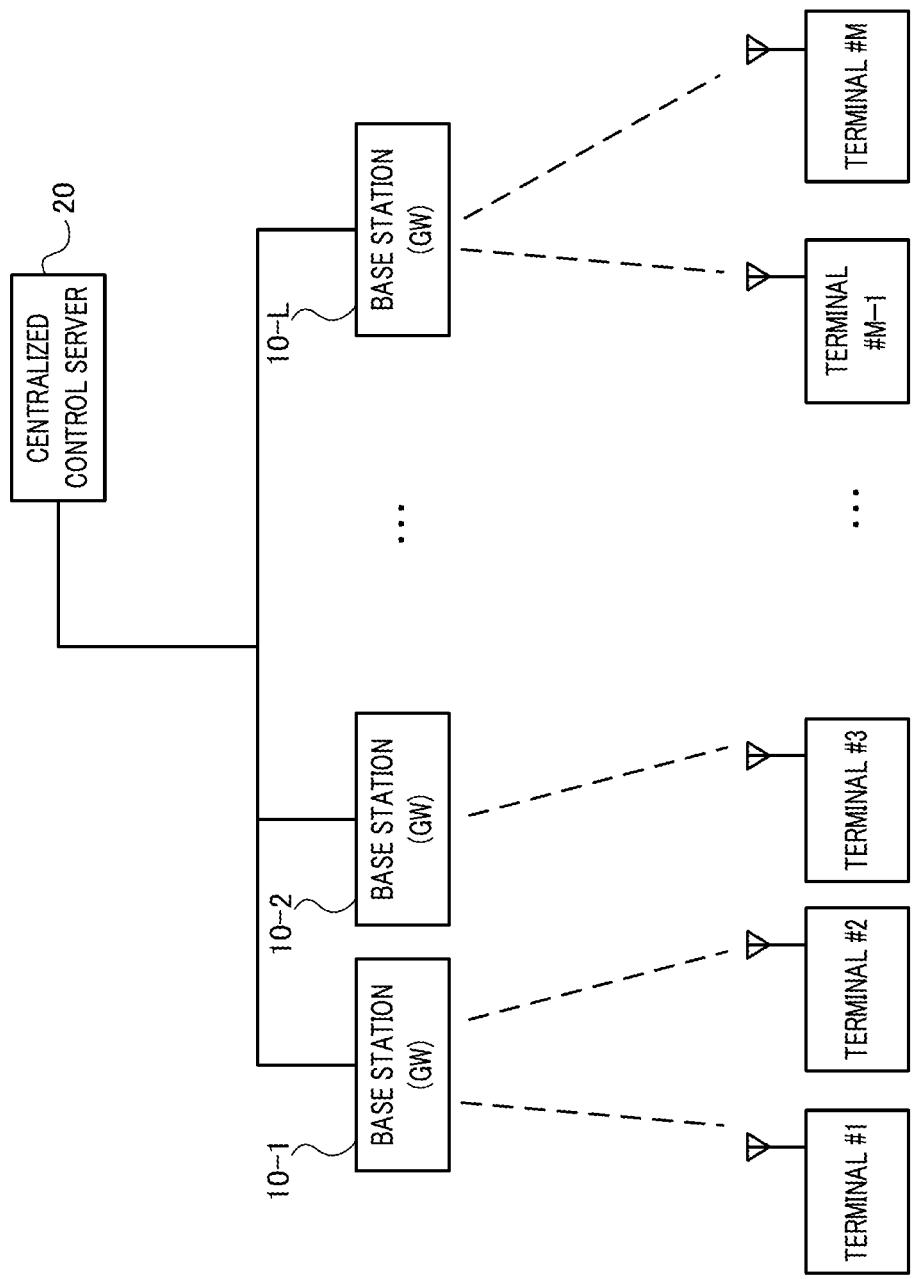
FIG. 2 is a block diagram illustrating an exemplary configuration of a network according to an embodiment of the present disclosure.

FIG. 2 is a block diagram illustrating an exemplary configuration of a network (NW) according to the present embodiment. The network illustrated in FIG. 2 includes base stations 10 (base station 10-1 to 10-L (L is an integer greater than or equal to 1)), centralized control server 20, and terminals #1 to #M (M is an integer greater than or equal to 1). Apparatuses included in the network illustrated in FIG. 2 correspond to the apparatuses in group #1 illustrated in FIG. 1, and support the LPWA system communication, for example.

Base station 10 is connected to a terminal (any of terminals #1 to #M) by radio, and performs radio communication in a channel assigned to the terminal. Base station 10 also performs interference monitoring in each of the available channels, and outputs a result of interference classification to centralized control server 20.

Centralized control server 20 is connected with base station 10 by wire, and acquires the classification result from base station 10. Centralized control server 20 may also acquire, from base station 10, information on a terminal radio-connected to base station 10. Centralized control server 20 determines a channel to be assigned to the terminal by base station 10 based on the classification result. Centralized control server 20 outputs, to base station 10, assignment information including information of the channel to be assigned to the terminal.

Each of terminals #1 to #M is an LPWA terminal that performs the LPWA system communication with base station 10 (any of base stations 10-1 to 10-L).

<Exemplary Configuration of Base Station>

Figure 3:
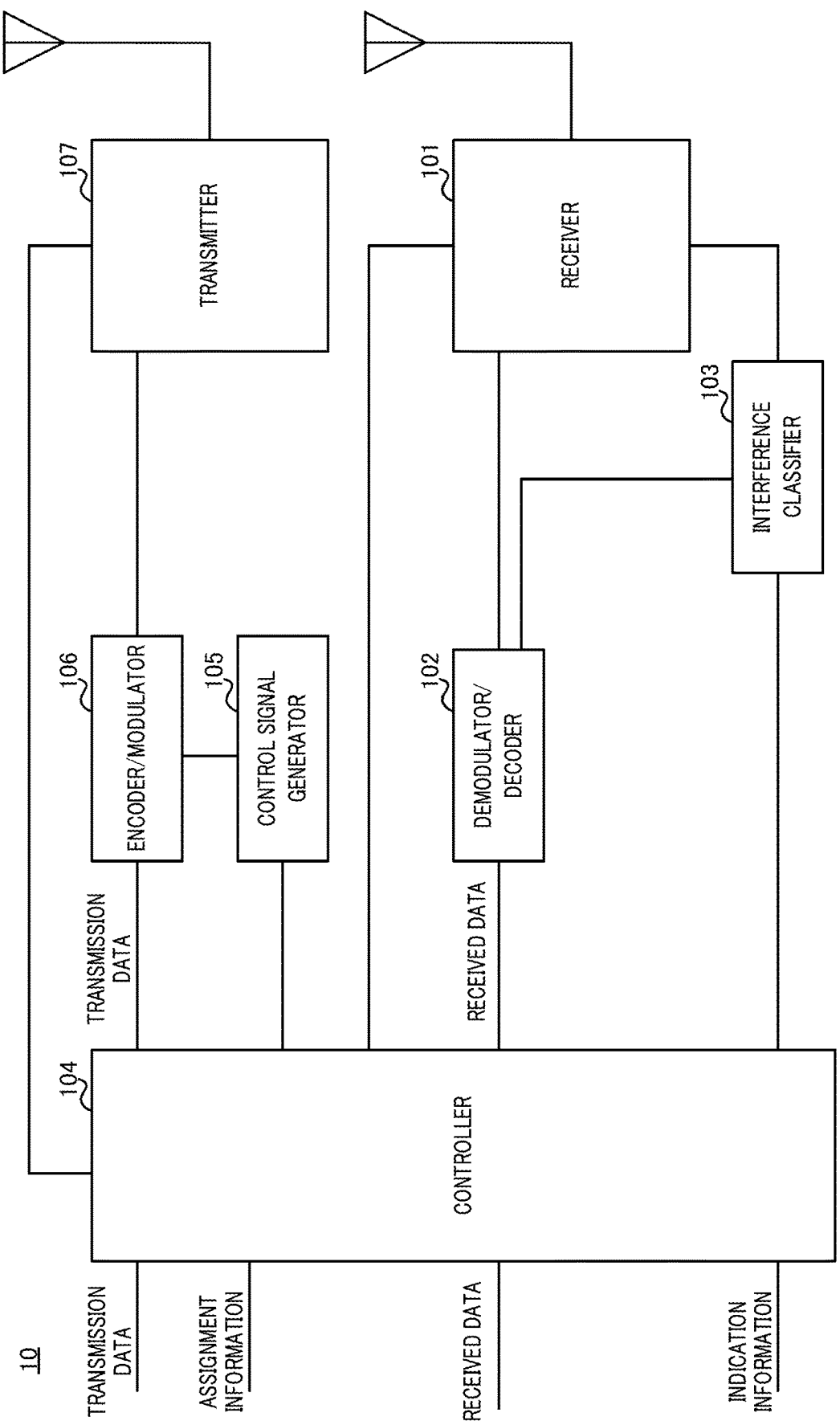
FIG. 3 is a block diagram illustrating an exemplary configuration of a base station according to an embodiment of the present disclosure.

FIG. 3 is a block diagram illustrating an exemplary configuration of base station 10 according to the present embodiment. Base station 10 corresponds to, for example, GW #1 or GW #2 belonging to NW #1 illustrated in FIG. 1.

Base station 10 includes receiver 101, demodulator/decoder 102, interference classifier 103, controller 104, control signal generator 105, encoder/modulator 106, and transmitter 107.

Receiver 101 receives a signal transmitted by a terminal, and performs predetermined reception processing on the received signal. For example, the predetermined reception processing includes a frequency conversion process (downconversion) based on the frequency of a channel assigned to the terminal or the frequency of a channel for transmitting a control signal. Information on the frequency of the channel assigned to the terminal may be acquired from controller 104, for example.

Receiver 101 also receives (detects) a signal in each of available channels in a system band (e.g., each channel included in an unlicensed band) for interference measurement (interference monitoring). Then, receiver 101 performs predetermined reception processing on the received signals. The predetermined reception processing includes, for example, a frequency conversion process based on the frequency of each channel.

Receiver 101 outputs the received signals subjected to the predetermined reception processing to demodulator/decoder 102 and interference classifier 103.

Demodulator/decoder 102 performs demodulation processing and decoding processing on the received signal acquired from receiver 101 to generate received data. Note that the received data may include an identifier that identifies a terminal belonging to the same NW (NW #1) as base station 10.

Interference classifier 103 classifies interference in each channel, for example. For example, interference classifier 103 monitors received signals in a single channel for a predetermined time period, and separates the in-control signals and the out-of-control interference described above from the received signals.

For example, interference classifier 103 detects a preamble of the received signal. A preamble of the LPWA system is given to a signal transmitted by a terminal supporting the LPWA system. For example, interference classifier 103 calculates correlation between the preamble used in the LPWA system and the received signal. The preamble used in the LPWA system may be the same regardless of the NW to which the source terminal of the received signal belongs.

Interference classifier 103 determines that the source of the received signal is not an LPWA terminal when the correlation result of the preamble and the received signal does not have a peak equal to or greater than a predetermined value. In this case, interference classifier 103 determines that the source of the received signal is a radio apparatus supporting a radio system other than the LPWA system, and that the received signal corresponds to environmental noise, which is an example of the out-of-control interference.

For example, interference classifier 103 determines that the source of the received signal is an LPWA terminal when the correlation result of the preamble and the received signal has a peak equal to or greater than the predetermined value.

Here, the preamble used for the LPWA system communication may be the same regardless of the NW to which the source terminal of the received signal belongs. Thus, when determining that the source of the received signal is an LPWA terminal, interference classifier 103 determines whether the NW to which the source belongs is the same NW (NW #1) as that of base station 10 or a NW different from that of base station 10 (e.g., NW #2 in FIG. 1).

For example, interference classifier 103 determines the NW to which the source belongs based on the decoding result of the received signal acquired from demodulator/decoder 102. When the received signal is correctly decoded and the received signal includes an identifier, for example, interference classifier 103 determines that the NW to which the source of the received signal belongs is the same NW as that of base station 10. Meanwhile, when the received signal is not correctly decoded and the received signal includes no identifier, for example, interference classifier 103 determines that the NW to which the source of the received signal belongs is a NW different from that of base station 10.

When the source of the received signal is the LPWA terminal belonging to NW #1, which is the same as base station 10, interference classifier 103 determines that the received signal corresponds to the in-control signal. When the source of the received signal is the LPWA terminal belonging to a NW different from that of base station 10, interference classifier 103 determines that the received signal corresponds to radio interference, which is an example of the out-of-control interference.

Note that the classification method in interference classifier 103 is not limited to the method based on the preamble detection result of the received signal and the decoding result of the received signal described above.

For example, interference classifier 103 may classify the received signals as the in-control signals and interference other than the in-control signals (out-of-control interference). In this case, interference classifier 103 need not classify the out-of-control interference into the radio interference and the environmental noise. For example, interference classifier 103 may detect the out-of-control interference by separating the in-control signals from the received signals (i.e., classification) based on the decoding result of the received signals and subtracting the in-control signals from the received signals.

Interference classifier 103 may determine an index representing the amount of traffic in each channel from the amount of interference resulting from the classification. For example, the amount of traffic may be a packet delivery ratio in each channel. Note that exemplary determination of the index in interference classifier 103 will be described later.

Interference classifier 103 performs the interference monitoring and outputs indication information representing the result of classifying the interference to controller 104. The indication information may include, for example, the amount of the classified interference or the index determined from the amount of the interference.

Note that the amount of interference may be represented in any way. For example, the amount of interference may be represented by a mean value, a minimum value, or a maximum value of received signal power, which may be referred to as interference power. Alternatively, the amount of interference may be represented using a relationship between the received signal power and a time period for receiving the received signals, which may be referred to as a monitoring period. For example, the amount of interference may be represented by a time period in which the received signal power has a value equal to or greater than a predetermined value, or may be represented by whether the time period in which the received signal power has a value equal to or greater than a predetermined value is equal to or longer than a predetermined length. Additionally, the in-control signals and the amount of the out-of-control interference may be represented in the same manner or in different manners.

Controller 104 acquires assignment information on a channel assigned to a terminal from centralized control server 20 in NW #1 (see FIGS. 1 and 2).

Controller 104 outputs the assignment information to control signal generator 105.

Controller 104 also performs control on data communication with the terminal. For example, controller 104 may output the received data acquired from demodulator/decoder 102 to an external network (not illustrated) or another apparatus in NW #1. In addition, controller 104 outputs, to encoder/modulator 106, transmission data addressed to the terminal acquired from an external network or another apparatus in NW #1.

Control signal generator 105 generates a control signal addressed to the terminal based on the information acquired from controller 104. Control signal generator 105 outputs the control signal to encoder/modulator 106.

Encoder/modulator 106 performs encoding processing and modulation processing on the transmission data acquired from controller 104 to generate a transmission signal. Encoder/modulator 106 also performs encoding processing and modulation processing on the control signal acquired from control signal generator 105 to generate a transmission control signal. Encoder/modulator 106 outputs the transmission signal and/or the transmission control signal to transmitter 107.

Transmitter 107 performs predetermined transmission processing on the transmission signal. For example, the predetermined transmission processing includes a frequency conversion process (up-conversion) based on the frequency of a channel assigned to the terminal. Assignment information on the frequency of the channel assigned to the terminal may be acquired from controller 104, for example.

Further, transmitter 107 performs predetermined transmission processing on the transmission control signal. For example, the predetermined transmission processing includes a frequency conversion process (up-conversion) based on the frequency of a channel for transmitting the transmission control signal to the terminal. The channel for transmitting the transmission control signal to the terminal may be, for example, a predetermined channel or a channel currently used for communication with the terminal.

<Exemplary Configuration of Centralized Control Server>

Figure 4:
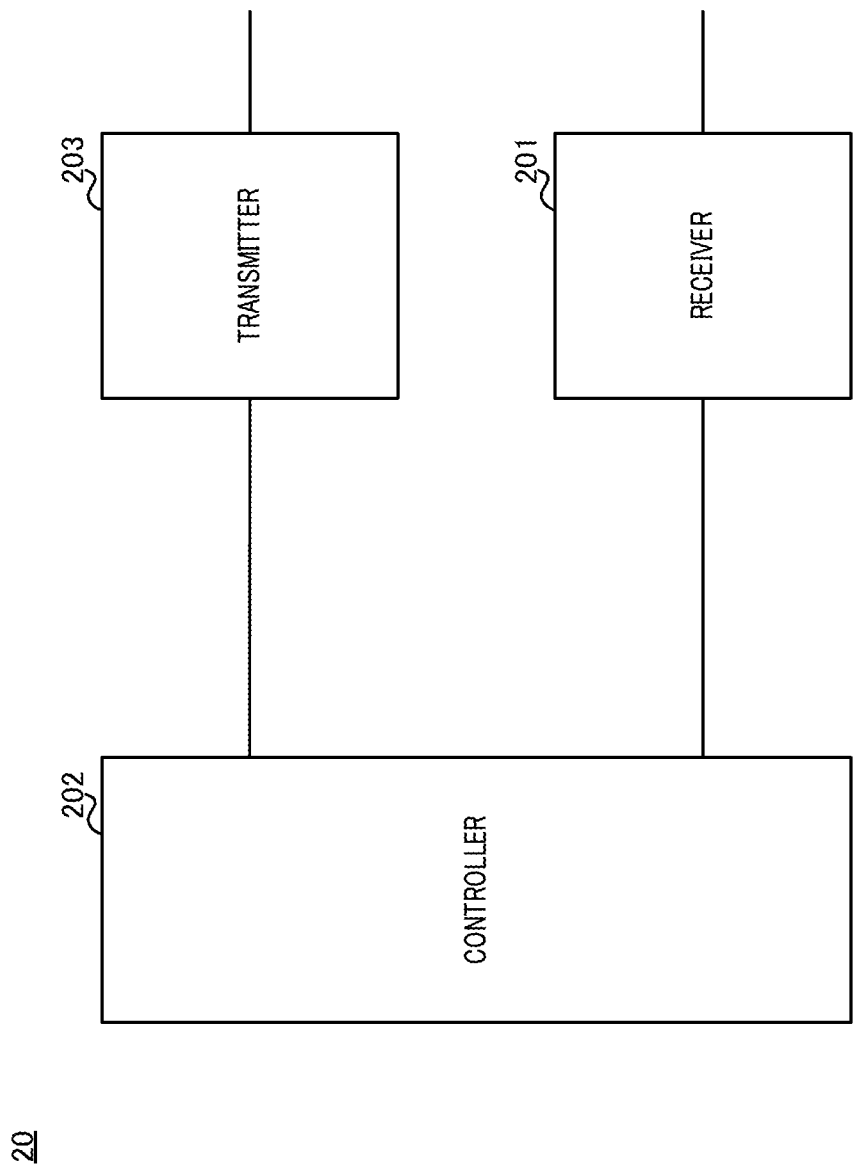
FIG. 4 is a block diagram illustrating an exemplary configuration of a centralized control server according to an embodiment of the present disclosure.

FIG. 4 is a block diagram illustrating an exemplary configuration of centralized control server 20 according to the present embodiment. Centralized control server 20 belongs to, for example, NW #1 illustrated in FIG. 1. For example, centralized control server 20 is connected to above-described base station 10 by wire. Alternatively, centralized control server 20 may be connected to a network, such as the Internet, by wire, and connected to base station 10 via the network.

Centralized control server 20 includes receiver 201, controller 202 and transmitter 203.

Receiver 201 receives, for example, information from base station 10. For example, the information received from base station 10 may be various information including the indication information. The information received from base station 10 may also include information on channel assignment in base station 10. The information on channel assignment includes, for example, information on terminals currently radio-connected to base station 10 and/or a terminal requesting radio connection to base station 10. The information on terminals may include information on the number of terminals and/or a duty cycle of each terminal.

Controller 202 performs channel assignment for base station 10 based on the information received from base station 10. For example, controller 202 determines the number of terminals to be assigned to each of channels used by base station 10 based on the indication information. Further, controller 202 may determine terminals to be assigned to each of the channels based on the determined number of terminals.

Note that exemplary channel assignment in controller 202 will be described later.

Transmitter 203 transmits to base station 10 assignment information indicating a result of the channel assignment in controller 202.

Note that the above description is about an example where the configuration illustrated in FIG. 3 is included in single base station 10, and the configuration illustrated in FIG. 4 is included in single centralized control server 20. The present disclosure is not limited to these, however. For example, base station 10 may include at least some part of the configuration of centralized control server 20, and centralized control server 20 may include at least some part of the configuration of base station 10. In the network illustrated in FIG. 2, for example, at least one of base stations 10 may have the configuration of centralized control server 20.

For example, the configuration of base station 10 illustrated in FIG. 3 may be divided into the first apparatus having a communication function of the LPWA system and the second apparatus having a function of a radio interference monitoring apparatus (e.g., interference classifier 103).

In this case, for example, the second apparatus may acquire a decoding result of a received signal at the first apparatus, or may output indication information generated by the second apparatus to the first apparatus. In addition, for example, the second apparatus may be configured to acquire a received signal received by receiver 101 of the first apparatus, instead of having receiver 101.

Further, the functional blocks of the second apparatus may be included in a relay station. Alternatively, the second apparatus may operate being connected to a relay station.

<First Example of Channel Assignment>

Next, a description will be given of the first example of the channel assignment in controller 202 of centralized control server 20.

Note that, in the following description, an "in-control terminal" refers to a terminal belonging to the same network as that of centralized control server 20 and base station 10. In other words, the "in-control terminal" refers to a terminal under the control of the network to which centralized control server 20 belongs. Additionally, in the following description, an "out-of-control terminal" refers to a terminal and/or a radio apparatus that are not under the control of the network to which centralized control server 20 belongs. Note that the "out-of-control terminal" is not limited to an apparatus in a radio system, and may include a device that is a source of noise.

Interference classifier 103 of base station 10 monitors interference in each channel, and classifies the detected interference as out-of-control interference and in-control signals.

Interference classifier 103 calculates a mean duty cycle of in-control terminals from the in-control signals. For example, interference classifier 103 may calculate the mean duty cycle based on the number of terminals to be assigned and the length of a time period in which the in-control signals are detected.

Interference classifier 103 calculates channel utilization $r_i^u$ from the amount of the out-of-control interference. Note that "i" in channel utilization $r_i^u$ indicates an index of a channel, and "u" indicates that $r_i$ is channel utilization of out-of-control interference. For example, when the number of channels is $N_{CH}$ ($N_{CH}$ is an integer greater than or equal to 1), "i" takes any one of the integers from 0 to $N_{CH}-1$. Note that, in the following description, the channel utilization determined from the amount of out-of-control interference is sometimes referred to as "channel utilization of out-of-control interference".

For example, the ratio of a time period to be monitored and a time period in which the power of out-of-control interference is equal to or greater than a threshold may be determined to be the channel utilization of out-of-control interference.

Figure 5:
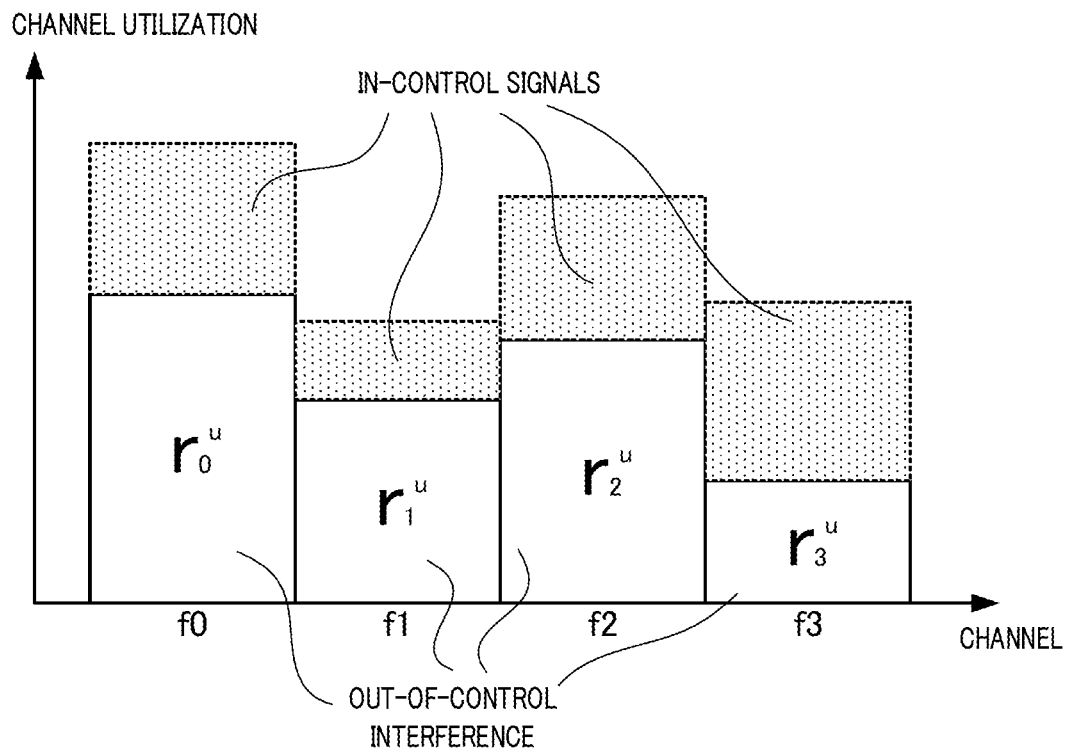
FIG. 5 illustrates the first example of an interference classification result in an embodiment of the present disclosure.

FIG. 5 illustrates the first example of an interference classification result according to the present embodiment. The horizontal axis in FIG. 5 indicates frequency (channels) and the vertical axis indicates channel utilization. FIG. 5 illustrates the channel utilization of out-of-control interference in each of four channels f0 to f4.

Interference classifier 103 calculates packet delivery ratio $\lambda_i^u$ from channel utilization $r_i^u$ of out-of-control interference. In the following, the packet delivery ratio converted from the channel utilization of out-of-control interference may be referred to as a "packet delivery ratio of out-of-control interference". In addition, the packet delivery ratio of out-of-control interference corresponds to an example of the amount of out-of-control traffic determined based on the amount of out-of-control interference. For example, in a case where a transmission collision ratio for packet transmission of random access follows the Poisson distribution, packet delivery ratio $\lambda_i^u$ relative to channel utilization $r_i^u$ is converted using following Expression 1:

[1]

$$\lambda_i^u = -ln(1-r_i^u) \quad \text{(Expression 1)}.$$

The conversion to the packet delivery ratio allows the amount of traffic in each channel to be expressed by addition.

Note that packet delivery ratio $\lambda_i^u$ of out-of-control interference corresponds to the sum of duty cycles of out-of-control terminals. For example, in a case where the duty cycles of out-of-control terminals are identical to each other, the packet delivery ratio in a certain channel corresponds to the product of the number of out-of-control terminals currently using the certain channel and the duty cycle.

Base station 10, however, is unable to know the number of out-of-control terminals currently using the certain channel and the duty cycle since the out-of-control terminals are not under the control of base station 10. In that case, the packet delivery ratio can be estimated based on the channel utilization of out-of-control interference.

Next, controller 202 of centralized control server 20 determines distribution of the packet delivery ratio to the in-control terminals based on the packet delivery ratio of out-of-control interference included in the indication information acquired from base station 10. For example, controller 202 uses Expression 2 and Expression 3 to determine packet delivery ratio $\lambda_i^m$ of the in-control terminals in each channel. Note that the packet delivery ratio of the in-control terminals corresponds to an example of the amount of in-control traffic to be distributed to the in-control terminals.

[2]

$$\lambda_i^m = \max(\alpha - \lambda_i^u, 0) \quad \text{(Expression 2)}$$

[3]

$$\lambda_{total}^m = \Sigma_{i=0}^{N_{CH}-1} \lambda_i^m \quad \text{(Expression 3)}$$

Here, $N_{CH}$ indicates the total number of channels. For example, $N_{CH}$ is four in the example of FIG. 5. In addition, $\alpha$ is a value for satisfying Expression 2 and Expression 3. Here, $\lambda_{total}^m$ in Expression 3 is the sum of the packet delivery ratios of all the in-control terminals to be assigned. For example, $\lambda_{total}^m$ may be converted from in-control signals. For example, $\lambda_{total}^m$ may be determined from the number of the in-control terminals and duty cycles of the in-control terminals. For example, $\lambda_{total}^m$ may be the sum of the packet delivery ratios of the in-control terminals converted from channel utilization of the in-control signals prior to assignment determination.

Figure 6:
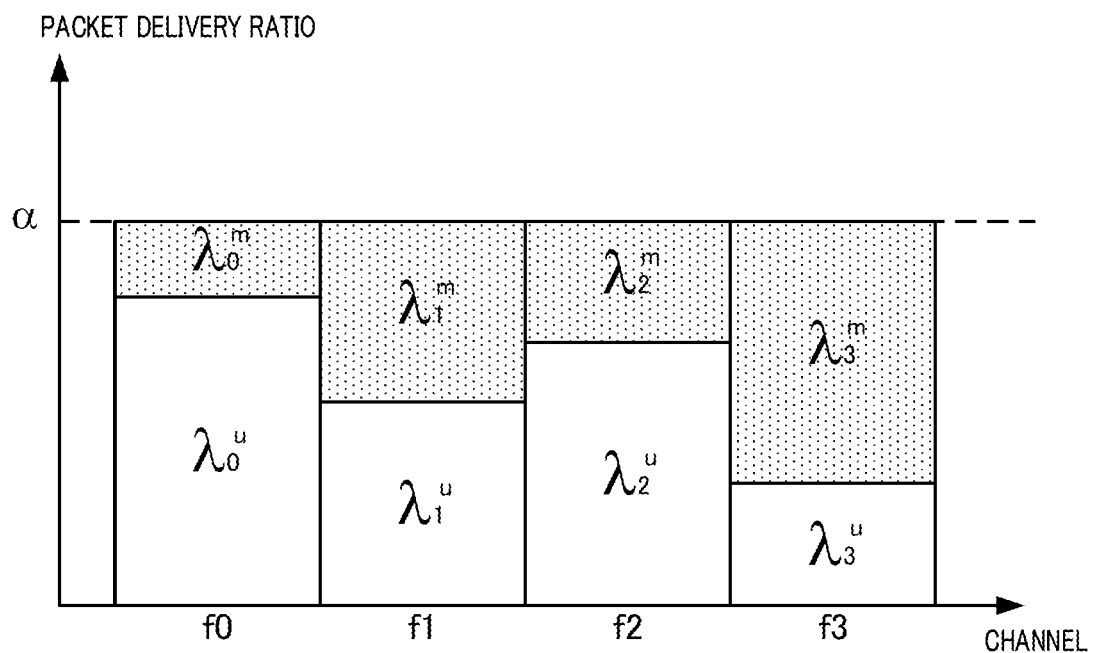
FIG. 6 illustrates the first example of a distribution result of packet delivery ratios in an embodiment of the present disclosure.

FIG. 6 illustrates the first example of a distribution result of the packet delivery ratios in the present embodiment. The horizontal axis in FIG. 6 indicates frequency (channels) and the vertical axis indicates the packet delivery ratio. As illustrated in FIG. 6, the sum of packet delivery ratio $\lambda_i^u$ of out-of-control interference and packet delivery ratio $\lambda_i^m$ of in-control terminals indicates constant value $\alpha$ in each channel. As illustrated in FIG. 6, the distribution of packet delivery ratios $\lambda_i^m$ is determined, so that the traffics in the channels are equalized, thereby improving frequency utilization efficiency. Note that the procedure for determining the distribution of the packet delivery ratios illustrated in FIG. 6 may be referred to as the "water filling algorithm" because packet delivery ratio $\lambda_i^m$ is determined in the manner of pouring water into a container formed by packet delivery ratio $\lambda_i^u$ of out-of-control interference.

Note that, although FIG. 6 illustrates an example where the sum of packet delivery ratio $\lambda_i^u$ and packet delivery ratio $\lambda_i^m$ is constant value $\alpha$ in each channel, the present disclosure is not limited to this. For example, the distribution of the packet delivery ratios may be determined so that the sum of packet delivery ratio $\lambda_i^u$ and packet delivery ratio $\lambda_i^m$ is within a predetermined range in each channel.

Note that, although FIG. 6 illustrates an example where packet delivery ratio $\lambda_i^m$ is distributed among the channels, the present disclosure is not limited to this. For example, there may be a channel where no packet delivery ratio $\lambda_i^m$ is distributed depending on the magnitude of packet delivery ratio $\lambda_i^u$ of out-of-control interference and packet delivery ratio $\lambda_i^m$.

Figure 7:
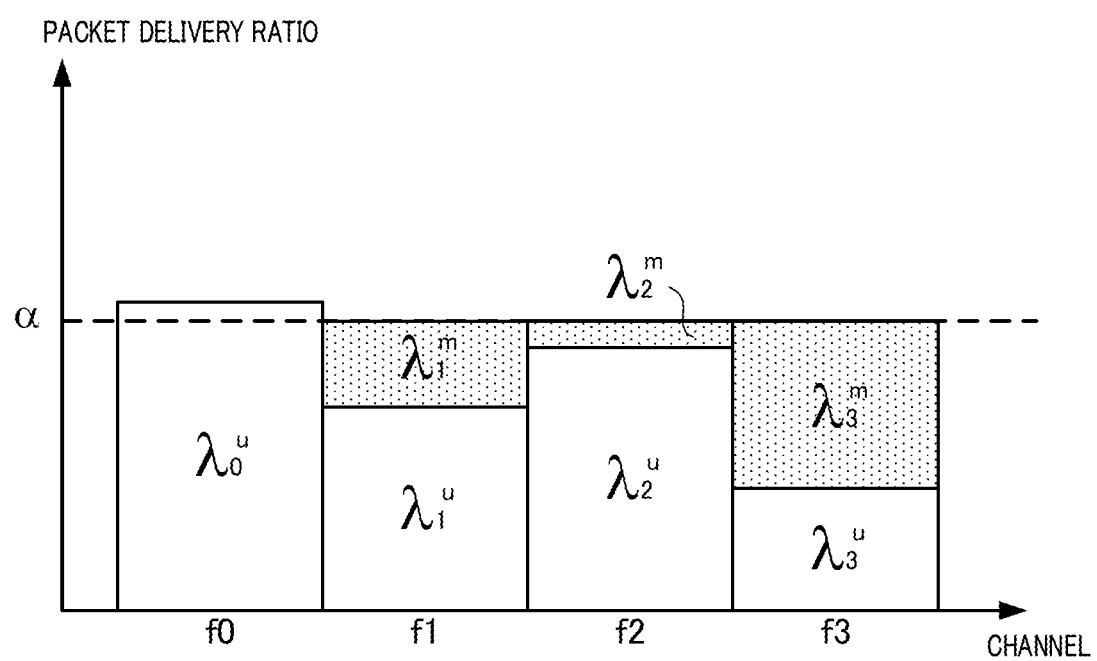
FIG. 7 illustrates the second example of a distribution result of the packet delivery ratios in an embodiment of the present disclosure.

FIG. 7 illustrates the second example of the distribution result of the packet delivery ratios in the present embodiment. The horizontal axis in FIG. 7 indicates frequency (channels) and the vertical axis indicates the packet delivery ratio. In the example of FIG. 7, packet delivery ratio $\lambda_i^m$ is not distributed to channel f0 because packet delivery ratio $\lambda_i^u$ of out-of-control interference in channel f0 is large and packet delivery ratio $\lambda_i^m$ that needs to be distributed is relatively small. Note that, although FIG. 7 illustrates an example where the sum of packet delivery ratio $\lambda_i^u$ and packet delivery ratio $\lambda_i^m$ is constant value $\alpha$ in each channel except for channel f0, the present disclosure is not limited to this. For example, the distribution of the packet delivery ratios may be determined so that the sum of packet delivery ratio $\lambda_i^u$ and packet delivery ratio $\lambda_i^m$ is within a predetermined range in each channel. In this case, packet delivery ratio $\lambda_i^m$ need not be distributed to a channel having packet delivery ratio $\lambda_i^u$ greater than or equal to the upper limit defining the predetermined range.

In the example of FIG. 6, channels f0 to f3 correspond to the channels to be assigned to terminals, and in the example of FIG. 7, channels f1 to f3 correspond to the channels to be assigned to terminals.

Next, controller 202 uses Expression 4 to determine, from packet delivery ratio $\lambda_i^m$, number $n_i^m$ of in-control terminals to be assigned to a channel corresponding to index i. Here, "d" represents a duty cycle of an in-control terminal.

[4]

$$n_i^m = \frac{\lambda_i^m}{d} \quad \text{(Expression 4)}$$

For example, when $n_i^m$ determined using Expression 4 is not an integer, controller 202 may convert it to an integer by rounding up, down, or rounding off the decimal point, for example. Controller 202 may also determine the number of in-control terminals for each channel based on $n_i^m$ determined using Expression 4 and the total number of in-control terminals assigned in base station 10. For example, the number of in-control terminals for each channel may be determined so as to satisfy a condition where the sum of the numbers of in-control terminals for each channel matches the number of in-control terminals assigned in base station 10 and a condition where the difference between $n_i^m$ determined using Expression 4 and the number of in-control terminals for each channel is less than or equal to a predetermined value.

Note that, although the number of in-control terminals is determined using Expression 4 when the duty cycles of the in-control terminals are the same, the present disclosure is not limited to this. The duty cycle may vary from one in-control terminal to another. For example, the duty cycle may be estimated from a classification result of interference monitoring. Alternatively, a pre-fixed value may be set as the duty cycle.

Controller 202 assigns in-control terminals to each channel based on the determined number of in-control terminals. The assignment may be performed in any way. For example, the in-control terminals may be randomly assigned or may be assigned based on the respective reception levels of the in-control terminals.

Note that, although the channel utilization of out-of-control interference is used above as an example, the present disclosure is not limited to this. Instead of the channel utilization of out-of-control interference, for example, a channel unused rate of the out-of-control interference may be used.

In the above description, the packet delivery ratio is converted from the channel utilization of out-of-control interference, but the present disclosure is not limited to this. Instead of the packet delivery ratio, for example, a packet arrival ratio or a packet collision ratio may be used. A method of converting to the packet arrival ratio or the packet collision ratio is not limited to a specific method. For example, the conversion method based on the Poisson distribution may be used as is the case with the packet delivery ratio described above. In a case of using the packet arrival ratio, for example, the water filling algorithm may be applied, as in the case of using the packet delivery ratio, to the packet arrival ratio of out-of-control interference to determine distribution of the packet arrival ratios to in-control terminals. Then, the number of in-control terminals to be assigned to each channel may be determined from the packet arrival ratios of in-control terminals.

Note that, although the water filling algorithm is applied to the packet delivery ratio of out-of-control interference in the above example, the present disclosure is not limited to this. For example, the packet delivery ratio of out-of-control interference may be converted to the number of out-of-control terminals, and the water filling algorithm may be applied to the converted number of out-of-control terminals. In this case, the water filling algorithm may result in the number of in-control terminals.

When the packet delivery ratio is converted to the number of out-of-control terminals, however, the converted number of out-of-control terminals may be a value that is not an integer. In such a case, the water filling algorithm may be applied to the value that is not an integer, or the value may be approximated to an integer by rounding up, down, or rounding off the decimal point, and then the water filling algorithm may be applied to the number of terminals of out-of-control interference, which has been approximated to an integer.

Further, when the water filling algorithm is applied after the conversion to the number of terminals, the number of in-control terminals to be obtained is possibly a value that is not an integer. In such a case, channel assignment may be performed based on the number of out-of-control terminals approximated to an integer by rounding up, down, or rounding off the decimal point, for example.

Note that the channel utilization, channel unused rate, packet delivery ratio, packet arrival ratio, packet collision ratio, and the number of terminals described above are all examples of the index representing the amount of traffic in a channel, but a different index representing the amount of traffic in a channel may be used in the present disclosure.

Note that the amount of traffic in a channel may be replaced by an amount of channel usage, how often a channel is used per unit time, etc.

Note that an upper limit may be set for $\alpha$. For example, in a case where $\alpha$ for satisfying Expression 2 and Expression 3 is equal to or greater than upper limit $\alpha_{limit}$, controller 202 determines the distribution of packet delivery ratios for in-control terminals so as to satisfy $\alpha < \alpha_{limit}$. In this case, the sum of $n_i^m$, where i=0 to $N_{CH}-1$, is possibly less than the total number of in-control terminals to be assigned, and possibly not all in-control terminals are assigned to channels. The in-control terminal that is not assigned to a channel stops transmission, and thus the duty cycle is reduced.

Providing the upper limit to $\alpha$ prevents an increase in the channel utilization of each channel, and reduces a possibility of transmission collision.

<Processing in First Example of Channel Assignment>

Figure 8:
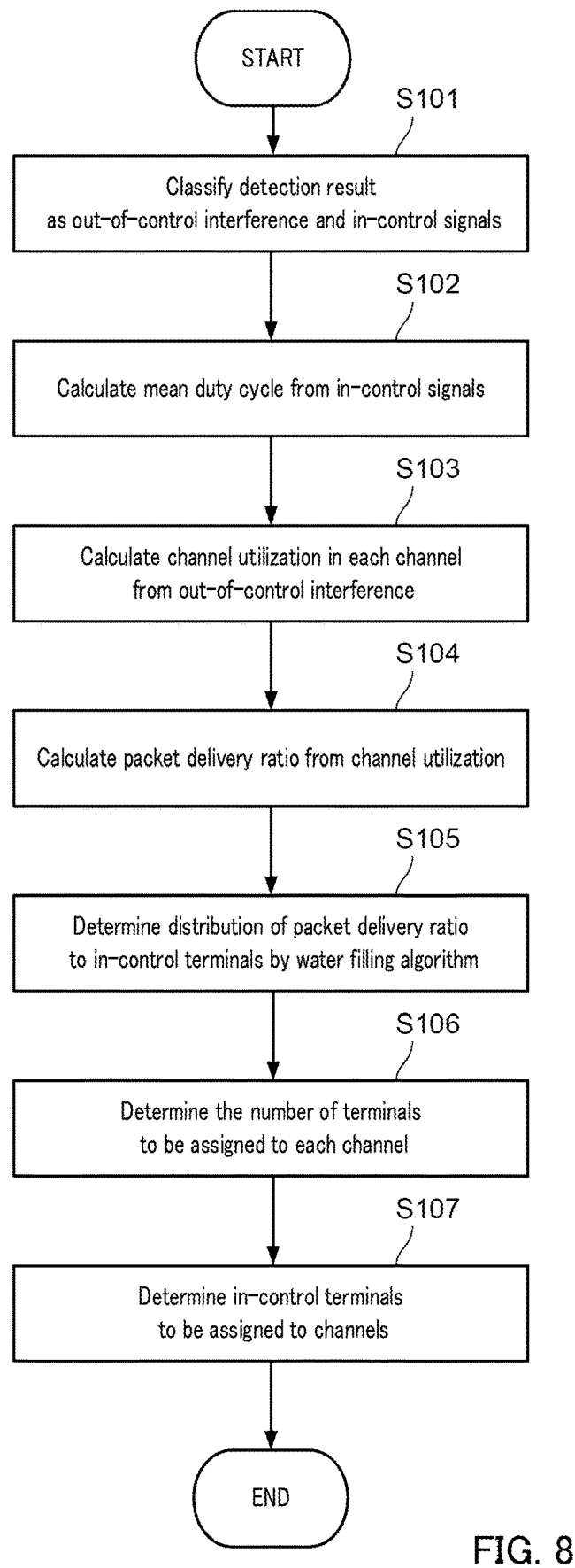
FIG. 8 is a flowchart describing the first example of channel assignment in an embodiment of the present disclosure.

Next, processing in the above-described first example will be described. FIG. 8 is a flowchart describing the first example of the channel assignment according to the present embodiment.

Base station 10 detects interference in each channel and classifies the detected result as out-of-control interference and in-control signals (S101).

Base station 10 calculates a mean duty cycle from the in-control signals (S102).

Base station 10 calculates channel utilization in each channel from the amount of the out-of-control interference in each channel (S103).

Base station 10 calculates a packet delivery ratio from the channel utilization in each channel (S104).

Centralized control server 20 applies the water filling algorithm to the packet delivery ratio of out-of-control interference and determines distribution of a packet delivery ratio to in-control terminals (S105).

Centralized control server 20 determines the number of terminals to be assigned to each channel from the distribution of the packet delivery ratio to the in-control terminals in each channel and the mean duty cycle (S106).

Centralized control server 20 determines the in-control terminals to be assigned to each channel (S107). This is the end of the processing.

Note that, although FIG. 8 includes processes in base station 10 and processes in centralized control server 20, at least some of the processes in base station 10 may be performed in centralized control server 20, or at least some of the processes in centralized control server 20 may be performed in base station 10.

In the first example of channel assignment described above, controller 202 of centralized control server 20 (an example of a control apparatus) determines a packet delivery ratio (an example of an in-control traffic amount) to be distributed to in-control terminals in each channel based on the sum of a packet delivery ratio (an example of an out-of-control traffic amount) of out-of-control interference in each of a plurality of channels determined according to the amount of the out-of-control interference and the packet delivery ratio to be distributed to the in-control terminals, and determines the number of in-control terminals to be assigned to each channel based on the determined packet delivery ratio to be distributed to the in-control terminals. By way of example, controller 202 applies the water filling algorithm to the packet delivery ratio to determine the distribution of the packet delivery ratio to the in-control terminals. This example prevents the sum of the out-of-control traffic amount and the in-control traffic amount in a particular channel from being larger than that in another channel, and it is thus possible to perform appropriate channel assignment taking interference into account. In addition, since the traffic amount is not skewed toward a particular channel, it is possible to reduce the possibility of transmission collision in the entire network (entire system band) and to improve the frequency utilization efficiency.

Further, in the first example of channel assignment described above, centralized control server 20 can acquire at any time the indication information indicating a classification result of interference monitoring in base station 10, and this allows an update of the channel assignment during an operation of the LPWA system.

<Second Example of Channel Assignment>

In the first example of channel assignment described above, the channel assignment is performed in single base station 10 based on a classification result of interference monitoring in each channel by the single base station 10. The present disclosure is not limited to this, and for example, the channel assignment may be performed in a plurality of base stations 10 based on a classification result of interference monitoring in each channel by the plurality of base stations 10. The following description is about an example where the channel assignment is performed in a plurality of base stations 10 based on a classification result of interference monitoring in each channel by two base stations 10.

Figure 9:
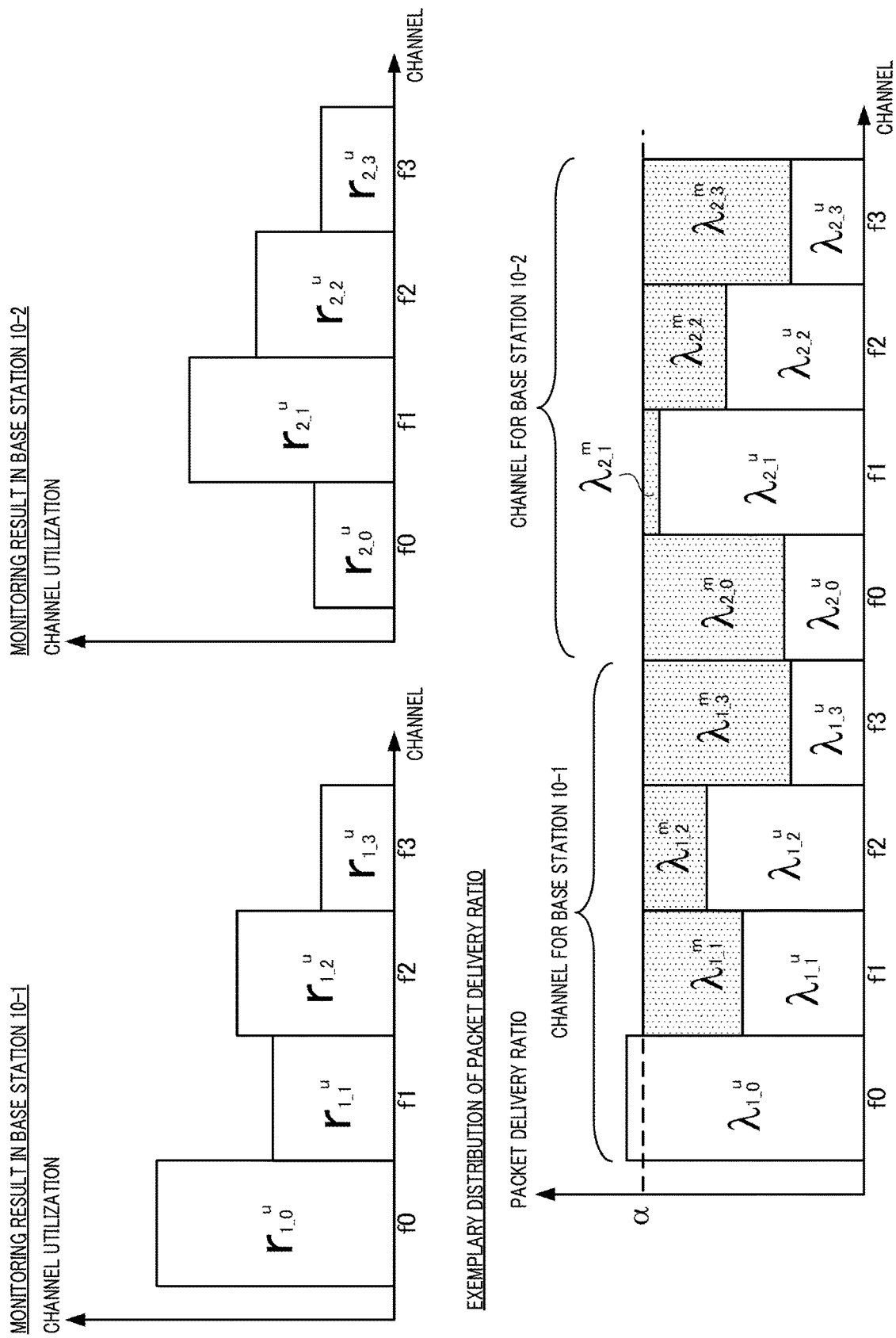
FIG. 9 illustrates an exemplary distribution result of the packet delivery ratios in the second example of the channel assignment.

FIG. 9 illustrates an exemplary distribution result of packet delivery ratios in the second example of channel assignment. FIG. 9 illustrates exemplary monitoring results in two base stations 10 (base station 10-1 and base station 10-2) and exemplary distribution of the packet delivery ratios obtained from the two monitoring results. The horizontal axis of the example of the monitoring results in two base stations 10 (base station 10-1 and base station 10-2) indicates frequency (channels) and the vertical axis indicates channel utilization. Note that, in channel utilization $r_{k\_i}^u$ and packet delivery ratio $\lambda_{k\_i}^u$, "i" indicates an index of a channel, "k" indicates an index that identifies base station 10, and "u" indicates that $r_{k\_i}^u$ and $\lambda_{k\_i}^u$ are respectively channel utilization and a packet delivery ratio of out-of-control interference. For example, in the example of FIG. 9, "i" is an integer from 0 to 3, and "k" is 1 or 2.

For example, interference classifiers 103 of two base stations 10 each classify interference detected by radio wave monitoring as out-of-control interference and in-control signals. Next, interference classifiers 103 of two base stations 10 each calculate channel utilization from the amount of the out-of-control interference. Interference classifiers 103 then each calculate a packet delivery ratio from the channel utilization. Note that a method of calculating the packet delivery ratio in interference classifiers 103 is the same as in the first example of the channel assignment described above, and thus the description thereof is omitted.

Controller 202 of centralized control server 20 applies the water filling algorithm to the packet delivery ratio converted in interference classifiers 103 of two base stations 10, and determines packet delivery ratio $\lambda_{k\_i}^m$ for in-control terminals in each channel. Here, when applying the water filling algorithm, controller 202 treats the same channels in a plurality of base stations as different channels. For example, as illustrated in FIG. 9, controller 202 treats channel f0 for base station 10-1 and channel f0 for base station 10-2 as different channels, and determines packet delivery ratio $\lambda_{k\_i}^m$ using the water filling algorithm. Note that a method of applying the water filling algorithm is the same as in the first example of the channel assignment described above, and thus the description thereof is omitted.

Controller 202 then determines the number of in-control terminals to be assigned to a channel corresponding to index i from packet delivery ratio $\lambda_{k\_i}^m$. Controller 202 then assigns in-control terminals to each channel based on the determined number of in-control terminals. Note that the channel assignment is performed for each of two base stations 10 in the second example.

<Processing in Second Example of Channel Assignment>

Figure 10:
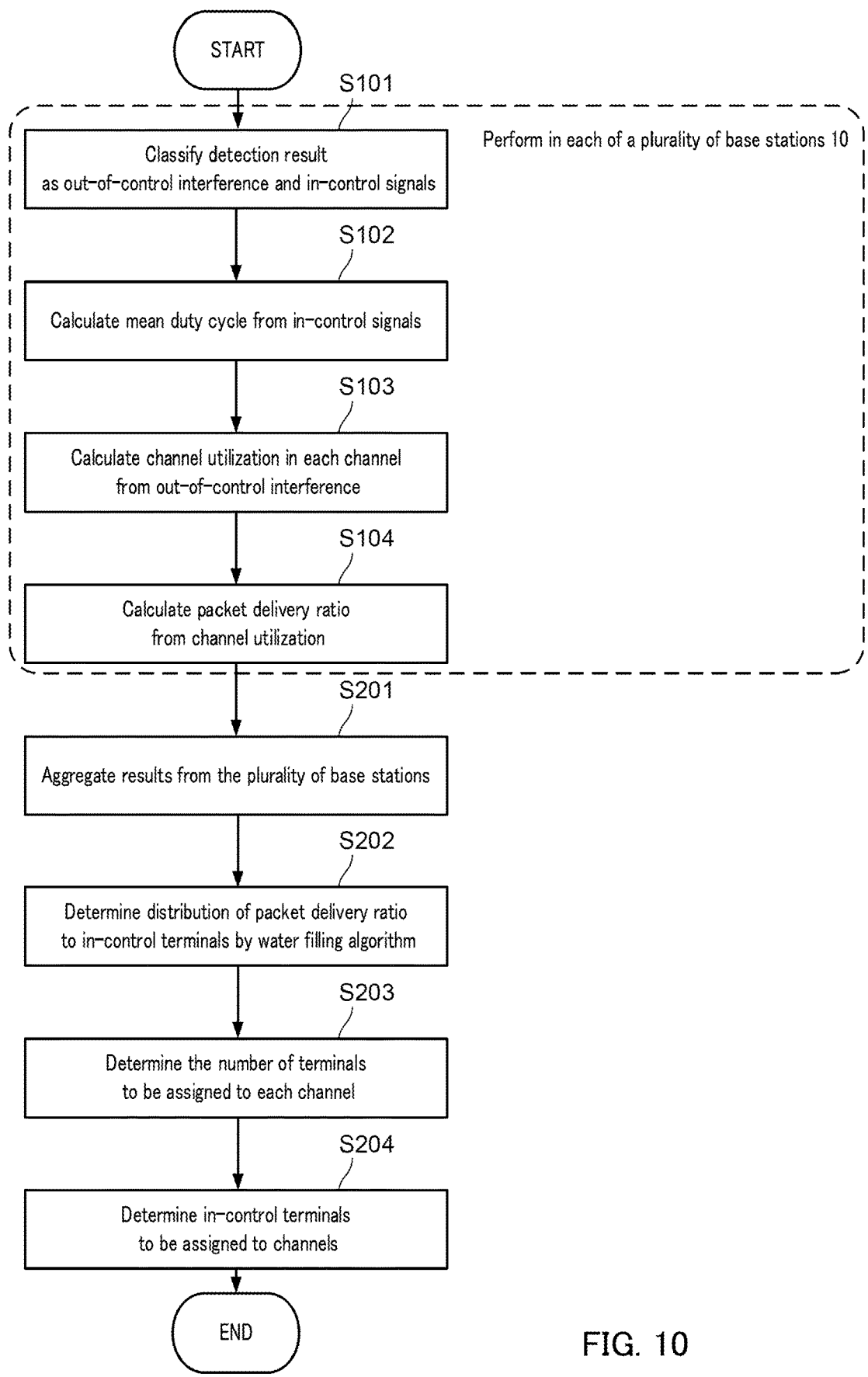
FIG. 10 is a flowchart describing the second example of the channel assignment in an embodiment of the present disclosure.

Next, processing in the above-described second example will be described. FIG. 10 is a flowchart describing the second example of the channel assignment according to the present embodiment. Note that, in FIG. 10, the same processes as in FIG. 8 are denoted by the same reference signs and the descriptions thereof will be omitted as appropriate.

In the processing illustrated in FIG. 10, the processes of S101 to S104 illustrated in FIG. 8 are performed in each of a plurality of base stations 10.

Centralized control server 20 then aggregates the results from the plurality of base stations 10 (S201). For example, centralized control server 20 aggregates the results by acquiring indication information from the plurality of base stations.

Next, centralized control server 20 applies the water filling algorithm and determines distribution of a packet delivery ratio to in-control terminals in each channel for each of the plurality of base stations 10 (S202).

Centralized control server 20 determines the number of terminals to be assigned to each channel for each of the plurality of base stations 10 from the distribution of the packet delivery ratio to the in-control terminals in each channel and the mean duty cycle (S203).

Centralized control server 20 determines the in-control terminals to be assigned to each channel (S204). This is the end of the processing.

Note that, although FIG. 10 includes processes in base station 10 and processes in centralized control server 20, at least some of the processes in base station 10 may be performed in centralized control server 20, or at least some of the processes in centralized control server 20 may be performed in base station 10.

In the second example of channel assignment described above, controller 202 determines a packet delivery ratio (an example of an in-control traffic amount) to be distributed to in-control terminals in each channel for each of a plurality of base stations 10 based on the sum of a packet delivery ratio of out-of-control interference in each of the plurality of base stations obtained from classification results of interference monitoring in the plurality of base stations 10 and the packet delivery ratio to be distributed to the in-control terminals. Then, controller 202 determines the number of in-control terminals to be assigned to each of the channels for the plurality of base stations 10 based on the packet delivery ratio to be distributed to the in-control terminals. This example prevents the sum of the amount of the traffic of out-of-control interference and the amount of the traffic of in-control terminals in a particular channel for particular base station 10 from being larger than that in another channel, and the sum is kept within a certain range in each channel for each base station 10. It is thus possible to perform appropriate channel assignment for the plurality of base stations 10 taking interference into account. In addition, since the traffic is not skewed toward a particular channel for particular base station 10, it is possible to reduce the possibility of transmission collision in the entire network (entire system band) and to improve the frequency utilization efficiency.

<Third Example of Channel Assignment>

In the first example and the second example of the channel assignment described above, interference in each channel is classified as in-control signals and out-of-control interference and the channel assignment is performed based on the out-of-control interference. In the third example, an example will be described in which out-of-control interference is classified based on the priority and the channel assignment is performed based on the interference with high priority.

Note that, in the following description, interference with relatively low priority among out-of-control interference is referred to as "low-priority interference", and interference with relatively high priority is referred to as "high-priority interference".

Criteria for the classification between the low-priority interference and the high-priority interference is not particularly limited. In a case where signal transmission of a radio apparatus (e.g., terminal) included in NW #1 having base station 10 is prioritized over signal transmission of a radio apparatus not included in NW #1, interference caused by the signal transmitted from the radio apparatus not included in NW #1 may correspond to the low-priority interference. In a case where the signal transmission of the radio apparatus not included in NW #1 is prioritized over the signal transmission of the radio apparatus included in NW #1, the interference caused by the signal transmitted from the radio apparatus not included in NW #1 may correspond to the high-priority interference.

For example, the low-priority interference in the LPWA system includes out-of-band leakage from a radio system that is different from the LPWA system and uses a band adjacent to a band used by the LPWA system. Alternatively, the low-priority interference in the LPWA system may include out-of-band leakage from a radio system that is different from the LPWA system and uses a channel adjacent to a channel used by the LPWA system. The low-priority interference in the LPWA system may also include equipment noise. For example, the low-priority interference in the LPWA system may include environmental noise caused by a radio system with lower priority than the LPWA system among the environmental noise exemplified in FIG. 1.

The high-priority interference in the LPWA system may be, for example, interference obtained from excluding the above-described low-priority interference in the LPWA system from out-of-control interference. For example, the high-priority interference may include the radio interference exemplified in FIG. 1. In addition, the high-priority interference in channel f0 includes interference from a radio system that is different from the LPWA system and uses the same channel f0.

Interference classifier 103 of base station 10 classifies the detected interference as in-control signals and out-of-control interference, and further classifies the out-of-control interference as high-priority interference and low-priority interference.

Note that interference classifier 103 may classify the out-of-control interference as the high-priority interference and the low-priority interference in any way. For example, interference classifier 103 may convert a received signal corresponding to the out-of-control interference into frequency domain and determine which radio system the frequency spectrum of the received signal corresponds to (whether the frequency spectrum corresponds to a radio system other than the LPWA system). Then, interference classifier 103 may classify the out-of-control interference as the high-priority interference and the low-priority interference by determining whether the determined radio system is prioritized over the LPWA system. Note that information on the frequency spectrum of another radio system and the priority of another radio system may be stored in advance in interference classifier 103.

Figure 11:
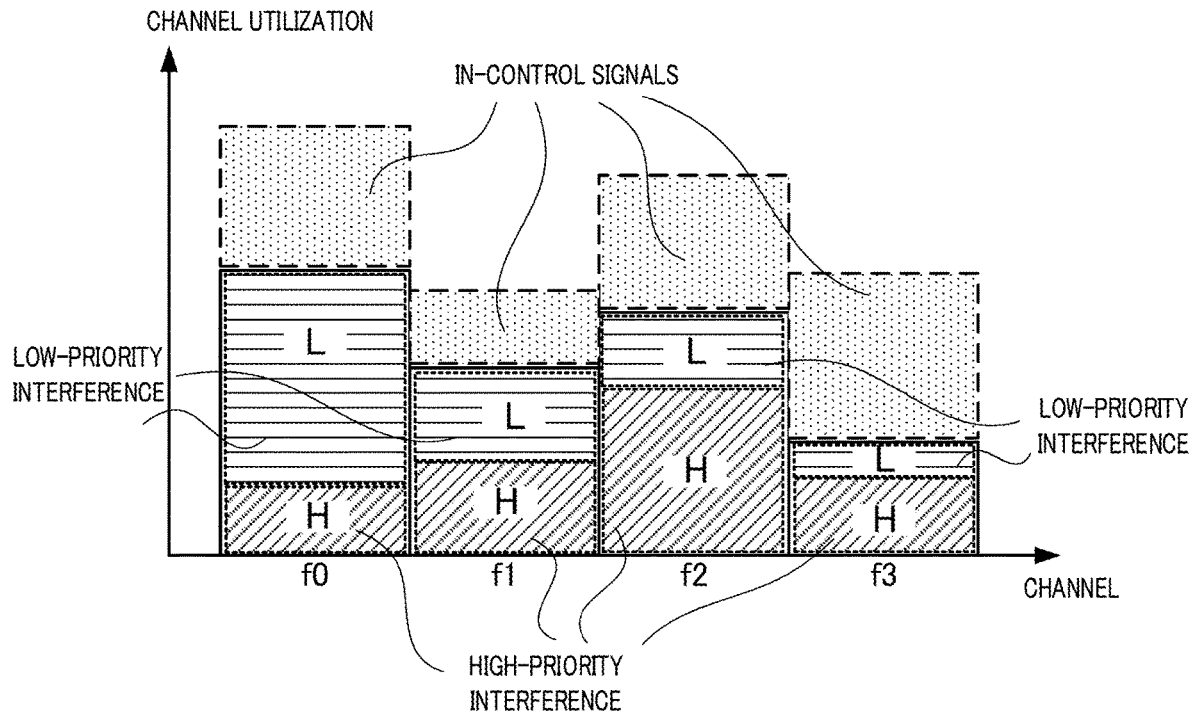
FIG. 11 illustrates the second example of the interference classification result in an embodiment of the present disclosure.

FIG. 11 illustrates the second example of the interference classification result according to the present embodiment. The horizontal axis in FIG. 11 indicates frequency (channels) and the vertical axis indicates channel utilization. FIG. 11 illustrates an example in which out-of-control interference in each of four channels is classified as high-priority interference ("H" in FIG. 11) and low-priority interference ("L" in FIG. 11).

Interference classifier 103 calculates channel utilization from the amount of the high-priority interference, and calculates packet delivery ratio $\lambda_i^H$ from the calculated channel utilization. Note that methods of calculating the channel utilization and calculating the packet delivery ratio are the same as those in the first example except that the target interference is replaced from the out-of-control interference to the high-priority interference, and thus descriptions thereof are omitted.

Controller 202 of centralized control server 20 applies the water filling algorithm to packet delivery ratio $\lambda_i^H$ obtained from the amount of the high-priority interference, and determines packet delivery ratio $\lambda_i^m$ for in-control terminals in each channel. Note that a method of applying the water filling algorithm is the same as that in the first example except that the packet delivery ratio to which the water filling algorithm is applied is replaced from the packet delivery ratio of the out-of-control interference to that of the high-priority interference, and thus a description thereof is omitted.

Figure 12:
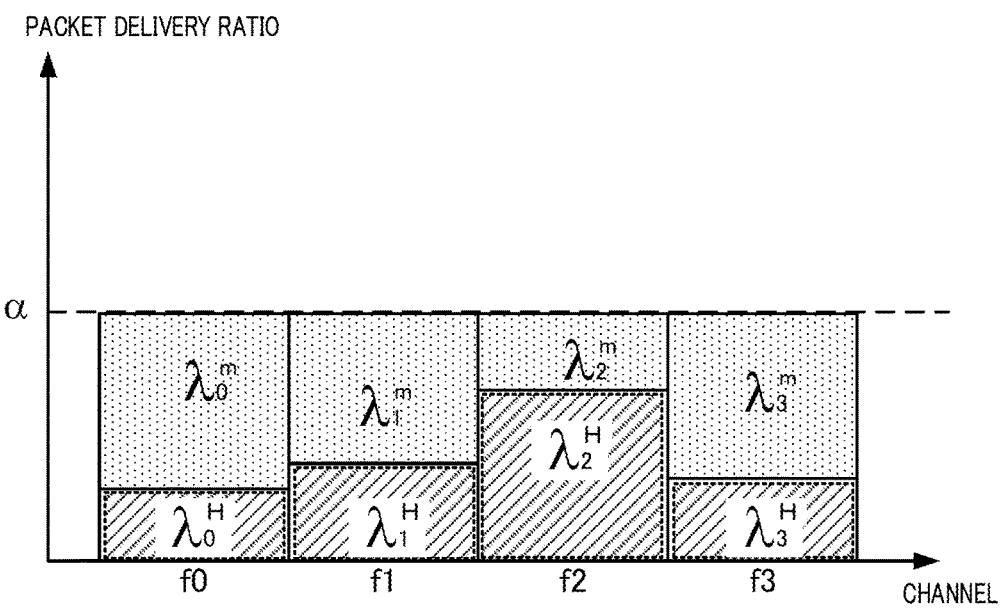
FIG. 12 illustrates the third example of a distribution result of the packet delivery ratios in an embodiment of the present disclosure.

FIG. 12 illustrates the third example of a distribution result of the packet delivery ratios in the present embodiment. The horizontal axis in FIG. 12 indicates frequency (channels) and the vertical axis indicates the packet delivery ratio. As illustrated in FIG. 12, the sum of packet delivery ratio $\lambda_i^H$ of the high-priority interference and packet delivery ratio $\lambda_i^m$ indicates constant value α in each channel. As illustrated in FIG. 12, the distribution of packet delivery ratios $\lambda_i^m$ is determined, so that the traffics in the channels are equalized, thereby improving the frequency utilization efficiency.

<Processing in Third Example of Channel Assignment>

Figure 13:
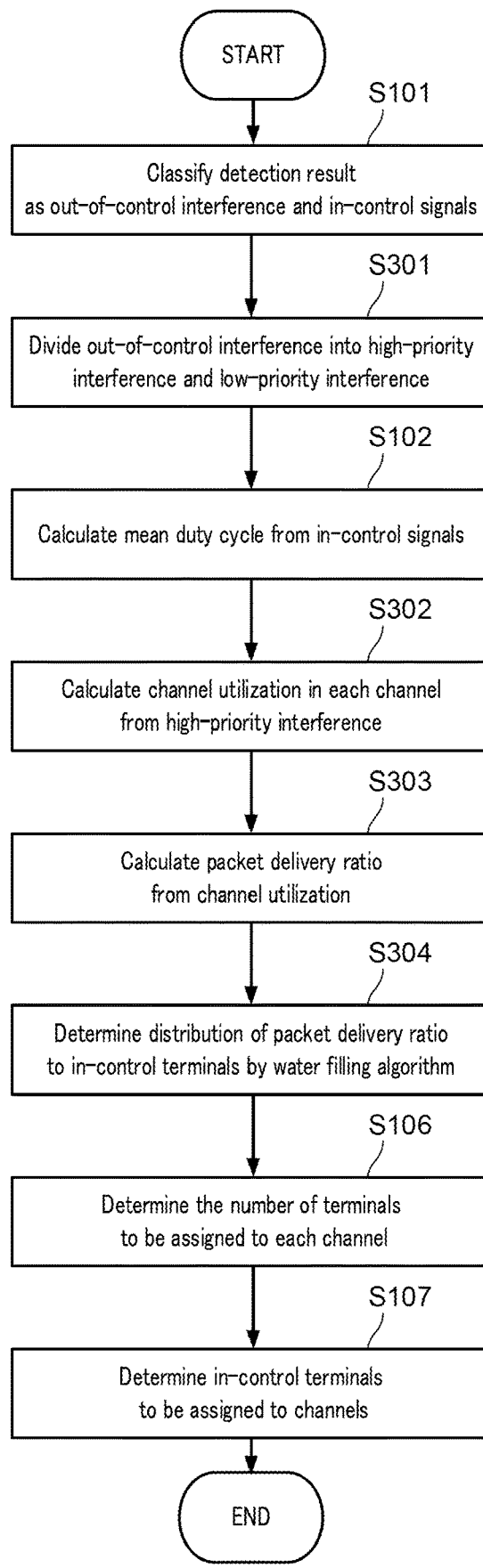
FIG. 13 is a flowchart describing the third example of the channel assignment in an embodiment of the present disclosure.

Next, processing in the above-described third example will be described. FIG. 13 is a flowchart describing the third example of the channel assignment according to the present embodiment. Note that, in FIG. 13, the same processes as in FIG. 8 are denoted by the same reference signs and the descriptions thereof will be omitted in some cases.

Base station 10 detects interference in each channel and classifies the detected result as out-of-control interference and in-control signals (S101).

Base station 10 classifies the out-of-control interference as high-priority interference and low-priority interference (S301).

Base station 10 calculates a mean duty cycle from the in-control signals (S102).

Base station 10 calculates channel utilization of the high-priority interference in each channel from the amount of the high-priority interference in each channel (S302).

Base station 10 calculates a packet delivery ratio of the high-priority interference from the channel utilization of the high-priority interference in each channel (S303).

Centralized control server 20 applies the water filling algorithm to the packet delivery ratio of the high-priority interference and determines distribution of a packet delivery ratio to in-control terminals in each channel (S304).

Centralized control server 20 determines the number of terminals to be assigned to each channel from the distribution of the packet delivery ratio to the in-control terminals in each channel and the mean duty cycle (S106).

Centralized control server 20 determines the in-control terminals to be assigned to each channel (S107). This is the end of the processing.

Note that, although FIG. 13 includes processes in base station 10 and processes in centralized control server 20, at least some of the processes in base station 10 may be performed in centralized control server 20, or at least some of the processes in centralized control server 20 may be performed in base station 10.

In the third example of channel assignment described above, out-of-control interference is classified as high-priority interference and low-priority interference, the water filling algorithm is applied to a packet delivery ratio obtained from the amount of the high-priority interference, and distribution of a packet delivery ratio to in-control terminals is determined. This example prevents the sum of the traffic amount caused by the high-priority interference and the traffic amount of the in-control terminals in a particular channel from being larger than that in another channel, and thus it is possible to perform appropriate channel assignment taking interference into account. In addition, since the traffic is not skewed toward a particular channel, it is possible to reduce the possibility of transmission collision in the entire network (entire system band) and to improve the frequency utilization efficiency.

Further, the third example of channel assignment reduces interference to a system with high priority, and improves the frequency utilization efficiency by aiming for coexistence with a system with low priority.

<Fourth Example of Channel Assignment>

Each of the above-described examples does not limit an assignment method for terminals to be assigned to each channel (e.g., which terminal is assigned to which channel) to a specific method.

For example, in radio systems of different types including a communication scheme called "LoRa" (referred to as a "LoRa scheme" below) and a communication scheme called "Wi-SUN" (referred to as a "Wi-SUN scheme" below), duty cycles and/or occupied channel widths of terminals may be different from each other.

For example, a single channel is used in the LoRa scheme and communication is performed with a duty cycle greater than that in the Wi-SUN scheme. In the Wi-SUN scheme, two channels are used and communication is performed with a duty cycle smaller than that in the LoRa scheme.

Various conditions may be taken into account in channel assignment, such as a duty cycle and an occupied channel width of each terminal. In addition, how often communication is performed per unit time (hereinafter referred to as "communication repetitions" or "repetitions of communication") requested by each terminal according to, for example, an application of a system operating in each terminal and/or communication quality of each terminal may be taken into account in channel assignment.

In the fourth example below, a description will be given of an exemplary method of determining which terminal is assigned to which channel in channel assignment. Note that, although the following description is about an example in which base station 10 performs the channel assignment, the present disclosure is not limited to this, and for example, centralized control server 20 may perform the channel assignment. Alternatively, base station 10 may perform some of the steps described below, and centralized control server 20 may perform the rest. Incidentally, a terminal to be described below may correspond to an "in-control terminal" of base station 10.

The channel assignment may include step 1 (sorting terminals) to determine the assignment order of terminals and step 2 to assign available channels to the terminals in the assignment order determined in step 1. Here, the available channels are channels that have in-control traffic amounts (e.g., packet delivery ratios $\lambda_i^m$) to be distributed to in-control terminals in the above-described examples. In the example of FIG. 6, channels f0 to f3 correspond to the channels that can be assigned to terminals, and in the example of FIG. 7, channels f1 to f3 correspond to the channels that can be assigned to terminals. Here, channels f0 to f3 may be channels respectively corresponding to channel numbers #0 to #3.

<Step 1: Sorting Terminals>

Step 1 includes sorting the assignment order of terminals to be assigned (assignment target terminals). The assignment target terminals may be, for example, at least some of terminals radio-connected to base station 10.

For example, the sorting may be interpreted as determining the order of the assignment target terminals (assignment order). Additionally, determining the assignment order may be interpreted as determining the priority of the assignment.

A method of determining (sorting) the assignment order of terminals is not limited to a specific method. For example, the assignment order may be random or may be determined based on a value of a predetermined parameter. For example, five examples are given below. Note that the predetermined parameter may be referred to as "assignment priority".

Example 1: Random order

Example 2: Order of communication quality (e.g., reception quality)

Example 3: Order of a value obtained by "dividing the elapsed time from the last successful communication by a required communication interval"

Example 4: Order of a value obtained by "dividing a mean value of time intervals of successful communication by a required communication interval"

Example 5: Order of a value obtained by "dividing the maximum value of time intervals of successful communication by a required communication interval"

Note that the examples of step 1 will be each described later.

In step 2 below, channels to be assigned to the terminals are determined according to the assignment order of the terminals determined in step 1.

<Step 2: Assigning Channels to Terminals>

The available channels (candidate channels) are assigned to the terminals in the assignment order determined in step 1, starting from the highest. There is no particular method as to which candidate channel is assigned to an assignment target terminal. For example, four methods are given below. The channel (candidate channel) that can be assigned to an assignment target terminal may correspond to, for example, a channel in which a duty cycle and/or an occupied channel width of the assignment target terminal are secured. For example, among packet delivery ratios $\lambda_i^m$ for in-control terminals distributed to channels, a channel to which a packet delivery ratio greater than a packet delivery ratio requested by the assignment target terminal is distributed may correspond to the channel (candidate channel) that can be assigned to the assignment target terminal. In other words, the available channel may be different for each terminal.

(First-Fit (FF))

Channels are assigned in order from a channel with the youngest (smallest) channel number among channels that can be assigned to an assignment target terminal. For example, in a case where channels f1 to f3 in FIG. 6 can be assigned to assignment target terminals, channel f1 is assigned to one of the assignment target terminals. For example, in a case where channel f0 cannot be assigned to terminal a but can be assigned to terminal b, which comes after terminal a in the assignment order of the terminals, channel f0 may be assigned to terminal b.

(Best-Fit (BF))

Channels are assigned in order from a channel with the smallest free space among channels that can be assigned to assignment target terminals. For example, in a case where channels f1 to f3 in FIG. 6 can be assigned to assignment target terminals, channel f2 is assigned.

(Worst-Fit (WF))

Channels are assigned in order from a channel with the largest free space among channels that can be assigned to assignment target terminals. For example, in a case where channels f1 to f3 in FIG. 6 can be assigned to assignment target terminals, channel f3 is assigned.

(Next-Fit (NF))

Channels are assigned in order from a channel with the youngest (smallest) channel number. In FIG. 6, for example, channels are assigned in order from channel f0. For example, in a case where channel f0 cannot be assigned to terminal a and channel f1 is assigned to terminal a, channel f0 is not assigned to terminal b even when channel f0 can be assigned to terminal b, which comes after terminal a in the assignment order of the terminals.

Note that the method in step 2 is not limited to the above four methods. For example, the method in step 2 corresponds to a method of filling an empty box with an item, where the empty box represents an in-control traffic amount to be distributed to in-control terminals in each channel and the item represents the traffic amount of the in-control terminals (e.g., the product of a channel width and the magnitude of a duty cycle). In other words, the method in step 2 may correspond to a solution to a "bin packing problem", which is a type of combinatorial optimization problems.

The method in step 2 is not limited to the above four methods, and another solution to a bin packing problem may be applied, such as a greedy method, a local search, a genetic algorithm, a particle swarm optimization, a column generation method, etc.

Next, the examples of step 1 will be each described.

EXAMPLE 1

Random Order

For example, in a case where the assignment order of terminals is randomly determined, the terminals are evenly assigned to channels in step 2. Thus, the random determination of the assignment order ensures fairness among the terminals in terms of transmission opportunities.

EXAMPLE 2

Order of Reception Quality

For example, in a case where the assignment order of terminals is determined to be the ascending order of reception quality (e.g., the ascending order of SINK), more transmission opportunities (e.g., channel assignment) are given to a terminal with poor communication quality (i.e., a terminal with low probability of successful reception). Thus, the determination of the assignment order based on the communication quality ensures fairness among the terminals in terms of the reception success rate.

EXAMPLE 3

Order of a Value Obtained by "Dividing the Elapsed Time From the Last Successful Communication by a Required Communication Interval"

The "required communication interval" may be, for example, a communication interval required by a function operating in a terminal or a function (e.g., an application) to be configured. For example, for a terminal running an application that performs communication (transmission/reception of data, etc.) at least once every five minutes, the "required communication interval" is set to five minutes. The "elapsed time from the last successful communication" may be, for example, time elapsed from the time of the most recent successful communication (e.g., successful transmission or reception of data, etc.). Note that the "required communication interval" may be fixed for each terminal, or may vary in a single terminal.

Next, exemplary values obtained by "dividing the elapsed time from the last successful communication by a required communication interval" and exemplary assignment order for the values will be described with reference to FIGS. 14 and 15.

Figures 14, 15:
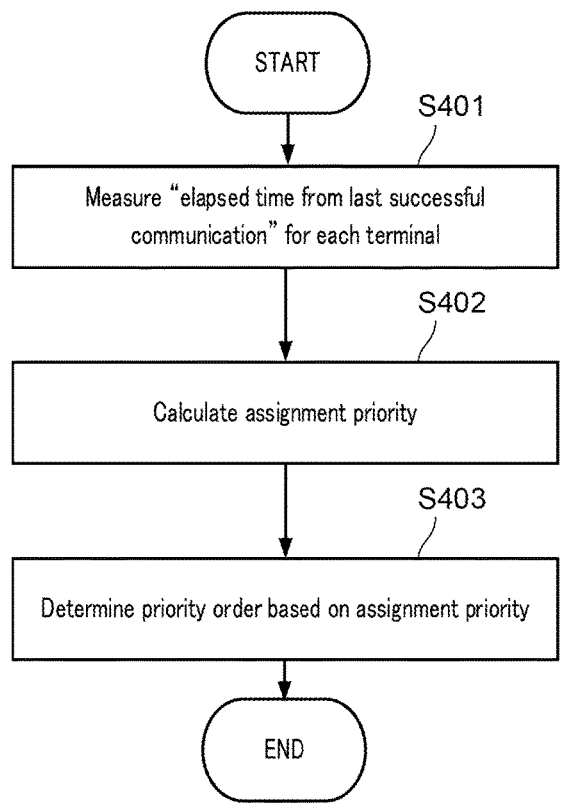
FIG. 14 illustrates exemplary determination of an assignment order of terminals in an embodiment of the present disclosure.
FIG. 15 is a flowchart describing processing of the determination of the assignment order of the terminals in an embodiment of the present disclosure.

FIG. 14 illustrates exemplary determination of the assignment order of terminals in the present embodiment.

FIG. 14 illustrates terminals 1 to 4 belonging to system 1 and terminals 5 to 8 belonging to system 2. System 1 is, for example, a system using an application with a required communication interval of 5 minutes. System 2 is, for example, a system using an application with a required communication interval of 10 minutes.

FIG. 14 also illustrates: the "elapsed time from the last successful communication"; the "assignment priority" indicating a result of dividing the "elapsed time from the last successful communication" by the "required communication interval"; and the "priority order" ranked from the highest assignment priority for each of terminals 1 to 8.

In the example illustrated in FIG. 14, terminal 3 is the first assignment target terminal among terminals 1 to 8, and channels are subsequently assigned to the terminals according to the priority order.

FIG. 15 is a flowchart describing processing of the determination of the assignment order of the terminals in the present embodiment. The processing described in FIG. 15 is performed in base station 10.

Base station 10 measures the "elapsed time from the last successful communication" for each terminal (S401).

Base station 10 calculates "assignment priority" in a case of performing channel assignment (S402).

Base station 10 determines the assignment order (priority order) based on the assignment priority (S403). This is the end of the processing in FIG. 15.

Fairness among the terminals can be ensured in terms of the required communication interval related to the repetitions of communication by the determination of the assignment order of terminals based on the values obtained by "dividing the elapsed time from the last successful communication by a required communication interval" in Example 3 ("assignment priority" in FIG. 14). According to the method of Example 3, a channel can be assigned preferentially to a terminal that has poor communication quality, has a long time elapsed from the last successful communication, and has no successful communication for a long time compared to the required communication interval.

Note that whether to assign a channel to a terminal may be determined based on the "assignment priority" in Example 3. For example, base station 10 may determine that a channel is assigned to a terminal with "assignment priority" equal to or greater than a threshold, and that a channel is not assigned to a terminal with "assignment priority" less than the threshold.

EXAMPLE 4

Order of a Value Obtained by "Dividing a Mean Value of Time Intervals of Successful Communication by a Required Communication Interval"

The "time interval of successful communication" may correspond to an interval between the timing of successful communication at a certain opportunity and the timing of successful communication at the next opportunity. Example 4 is an example in which the "elapsed time from the last successful communication" in Example 3 is replaced by the "mean value of the time intervals of successful communication".

For example, base station 10 measures the time intervals of successful communication for each terminal and determines the mean value of the time intervals of successful communication for each terminal. Then, as in Example 3 described above, base station 10 may determine the assignment order (priority order) ranked from the highest assignment priority based on the "assignment priority" indicating the result of dividing the "mean value of the time intervals of successful communication" by a "required communication interval".

Fairness among the terminals can be ensured in terms of the required communication interval related to the repetitions of communication by the determination of the assignment order of terminals based on the values obtained by "dividing the mean value of time intervals of successful communication by a required communication interval" in Example 4. According to the method of Example 4, a channel can be assigned preferentially to a terminal that has poor communication quality, has a long time interval of successful communication on average, and has no successful communication for a long time compared to the required communication interval.

EXAMPLE 5

Order of a Value Obtained by Dividing the Maximum Value of Time Intervals of Successful Communication by a Required Communication Interval Example 5 is an example in which the "elapsed time from the last successful communication" in Example 3 is replaced by the "maximum value of the time intervals of successful communication".

For example, base station 10 measures the time intervals of successful communication for each terminal and determines the maximum value of the time intervals of successful communication for each terminal. Then, as in Example 3 described above, base station 10 may determine the assignment order (priority order) ranked from the highest assignment priority based on the "assignment priority" indicating the result of dividing the "maximum value of the time intervals of successful communication" by a "required communication interval".

Fairness among the terminals can be ensured in terms of the required communication interval related to the repetitions of communication by the determination of the assignment order of terminals based on the values obtained by "dividing the maximum value of time intervals of successful communication by a required communication interval" in Example 5. According to the method of Example 5, a channel can be assigned preferentially to a terminal that has poor communication quality, has a long maximum time interval of successful communication, and has no successful communication for a long time compared to the required communication interval.

Note that Examples 1 to 5 of step 1 may be used in combination as appropriate. In Example 3, for example, the assignment order of a plurality of terminals having the same value obtained by "dividing the elapsed time from the last successful communication by a required communication interval" ("assignment priority" in FIG. 14) may be determined based on an example other than Example 3. Alternatively, the assignment order of terminals may be determined based on a plurality of parameters.

In the fourth example of channel assignment described above, the assignment order of terminals is determined based on a predetermined condition, and channels are assigned according to the determined order. This improves the frequency utilization efficiency and allows appropriate channel assignment depending on a condition for each terminal. For example, the condition for each terminal may include a condition relating to the communication quality of the terminal and/or a condition relating to the communication repetitions required of the terminal.

Note that, although the above-described embodiment and examples have been described with respect to the methods of classifying interference in the LPWA system and indicating information on the classified interference, the present disclosure is not limited to this. For example, the present disclosure may also be applied to the interference monitoring in a radio system other than the LPWA system.

In addition, the examples of assignment in the above-described embodiment may be used in combination. For example, the second example and the third example described above may be used in combination. In a case of using this combination, for example, centralized control server 20 may perform channel assignment for a plurality of base stations 10 based on high-priority interference among out-of-control interference from a classification result of interference monitoring in each channel in the plurality of base stations 10. Further, the examples of assignment in the above-described embodiment may be dynamically switched and used.

Note that the expression " . . . er (or)" in the embodiments described above may be replaced with other expressions such as " . . . circuit (circuitry)", " . . . device", " . . . unit" or " . . . module".

In addition, the expression "channel" in the embodiment described above may be replaced by other expressions such as "frequency", "frequency channel", "band", "carrier", "sub-carrier", or "(frequency) resource".

Further, the expression "calculate" in the embodiment described above may be replaced by other expressions such as "determine", "estimate", or "derive".

Furthermore, the expression "classify" in the embodiments described above may be replaced by other expressions such as "separate" or "extract".

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter or measurement device, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

While various embodiments have been described with reference to the drawings hereinabove, obviously, the present disclosure is not limited to these examples. Obviously, a person skilled in the art would arrive at variations and modification examples within a scope described in claims, and it is understood that these variations and modifications are within the technical scope of the present disclosure. Further, each component of the above-mentioned embodiments may be combined optionally without departing from the spirit of the disclosure.

Specific examples of the present disclosure have been described thus far, but these examples are only exemplary, and are not to limit the claims. Techniques recited in the claims include, for example, variations and/or modifications of the specific examples exemplified above.

The disclosures of Japanese Patent Application No. 2019-136836, filed on Jul. 25, 2019, and Japanese Patent Application No. 2019-220163, filed on Dec. 5, 2019, including the specifications, drawings and abstracts, are incorporated herein by reference in their entirety.

INDUSTRIAL APPLICABILITY

An exemplary embodiment of the present disclosure is useful for radio communication systems.

REFERENCE SIGNS LIST

10 Base station
101, 201 Receiver
102 Demodulator/decoder
103 Interference classifier
104, 202 Controller
105 Control signal generator
106 Encoder/Modulator
107, 203 Transmitter
20 Centralized control server

The invention claimed is:

1. A control apparatus that performs channel assignment for a terminal supporting a first radio system and belonging to a first network, the control apparatus comprising:
 a receiver, which in operation, acquires a classification result of classifying interference detected in each of a plurality of channels as first interference and second interference other than the first interference, the first interference being interference from a radio apparatus that supports the first radio system and belongs to the first network; and
 a controller, which in operation,
  determines an in-control traffic amount to be distributed to the terminal in each of the plurality of channels based on a sum of an out-of-control traffic amount in each of the plurality of channels and the in-control traffic amount, the out-of-control traffic amount being determined according to an interference amount of the second interference, and
  determines, based on the in-control traffic amount, a number of a plurality of the terminals to be assigned to each of the plurality of channels,
 wherein the controller determines the in-control traffic amount in each of the plurality of channels so that the sum of the out-of-control traffic amount and the in-control traffic amount is equal to or less than a predetermined upper limit.

2. The control apparatus according to claim 1, wherein,
the interference amount of the second interference correlates with channel utilization, and
the out-of-control traffic amount is any one of a packet delivery ratio, a packet arrival ratio, and/or a packet collision ratio that are converted from the channel utilization.

3. The control apparatus according to claim 1, wherein the controller uses a water filling algorithm to determine the in-control traffic amount in each of the plurality of channels so that the sum of the out-of-control traffic amount and the in-control traffic amount is within a predetermined range.

4. The control apparatus according to claim 3, wherein the controller does not distribute the in-control traffic amount to a channel in which the out-of-control traffic amount is equal to or greater than an upper limit defining the predetermined range.

5. The control apparatus according to claim 1, wherein,
the receiver acquires a plurality of the classification results from a plurality of base stations, and
the controller determines the in-control traffic amount in each of the plurality of channels for each of the plurality of base stations.

6. The control apparatus according to claim 1, wherein the out-of-control traffic amount is determined for each of the plurality of channels based on an interference amount of third interference from a radio apparatus that supports a second radio system having priority higher than that of the first radio system, the third interference being included in the second interference.

7. The control apparatus according to claim 1, wherein the controller determines the terminal to be assigned to each of the plurality of channels based on a condition on communication quality of the terminal and/or a condition on communication repetitions required of the terminal.

8. A control method for performing channel assignment for a terminal that supports a first radio system and belongs to a first network, the control method comprising:

acquiring a classification result of classifying interference detected in each of a plurality of channels as first interference and second interference other than the first interference, the first interference being interference from a radio apparatus that supports the first radio system and belongs to the first network;

determining an in-control traffic amount to be distributed to the terminal in each of the plurality of channels based on a sum of an out-of-control traffic amount in each of the plurality of channels and the in-control traffic amount, the out-of-control traffic amount being determined according to an interference amount of the second interference; and determining, based on the in-control traffic amount, a number of a plurality of the terminals to be assigned to each of the plurality of channels, wherein the in-control traffic amount in each of the plurality of channels is determined so that the sum of the out-of-control traffic amount and the in-control traffic amount is equal to or less than a predetermined upper limit.

\* \* \* \* \*